United States Patent [19]
Yoshino et al.

[11] Patent Number: 5,635,291
[45] Date of Patent: Jun. 3, 1997

[54] INK-JET RECORDING MEDIUM

[75] Inventors: Hitoshi Yoshino, Zama; Kyo Miura, Yokohama; Yuji Kondo, Machida, all of Japan

[73] Assignee: Canon Kabushiki Kaisha, Tokyo, Japan

[21] Appl. No.: 231,659

[22] Filed: Apr. 25, 1994

[30] Foreign Application Priority Data

| Apr. 28, 1993 | [JP] | Japan | 5-125437 |
| Apr. 28, 1993 | [JP] | Japan | 5-125438 |
| Apr. 28, 1993 | [JP] | Japan | 5-125439 |
| Dec. 28, 1993 | [JP] | Japan | 5-352110 |
| Dec. 28, 1993 | [JP] | Japan | 5-352111 |
| Dec. 28, 1993 | [JP] | Japan | 5-352112 |

[51] Int. Cl.$^6$ ............................................. B41J 2/01
[52] U.S. Cl. ................. 428/304.4; 428/195; 428/323; 428/329
[58] Field of Search ................... 428/212, 195, 428/206, 304.4, 329, 331, 323; 347/105

[56] References Cited

U.S. PATENT DOCUMENTS

| 4,202,870 | 5/1980 | Weber et al. | 423/630 |
| 4,242,271 | 12/1980 | Weber et al. | 260/448 AD |
| 4,683,002 | 7/1987 | Mirua et al. | 106/20 |
| 4,780,356 | 10/1988 | Otouma et al. | 428/212 |
| 4,879,166 | 11/1989 | Misuda et al. | 428/212 |
| 5,104,730 | 4/1992 | Misuda et al. | 428/304.4 |

FOREIGN PATENT DOCUMENTS

| 0407720 | 5/1990 | European Pat. Off. . |
| 0500021 | 2/1992 | European Pat. Off. . |
| 52-53012 | 4/1977 | Japan . |
| 53-49113 | 5/1978 | Japan . |
| 54-59936 | 5/1979 | Japan . |
| 55-5830 | 1/1980 | Japan . |
| 55-11829 | 1/1980 | Japan . |
| 55-51583 | 4/1980 | Japan . |
| 55-146786 | 11/1980 | Japan . |
| 58-110287 | 6/1983 | Japan . |
| 60-232990 | 11/1985 | Japan . |
| 60-245588 | 12/1985 | Japan . |
| 62-270378 | 11/1987 | Japan . |
| 2276670 | 11/1990 | Japan . |
| 2276671 | 11/1990 | Japan . |
| 3143678 | 6/1991 | Japan . |
| 3-72460 | 11/1991 | Japan . |
| 3275378 | 12/1991 | Japan . |
| 3281384 | 12/1991 | Japan . |
| 3285814 | 12/1991 | Japan . |

(List continued on next page.)

OTHER PUBLICATIONS

Rocek, et al., "Effect of Precipitation and Aging on Porous Structure of Aluminium Hydroxide. I. Statistical Treatment of Experimental Data", Collect. Czech. Chem. Commun., vol. 56, pp. 1253–1262 (1991).

McBain, "An Explanation of Hysteresis in the Hydration and Dehydration of Gels", The Journal of the American Chemical Society, vol. 57, pp. 699–700 (1935).

Kobayashi, "Surface", vol. 15, No. 5, pp. 282–295 (1977).

Rocek, et al., "Porous structure of aluminium hydroxide and its content of pseudoboehmite", Applied Catalysis, vol. 74, pp. 29–36 (1991.

Yang, et al., Reaction Kinetics and Catalysis Letters, vol. 46, No. 1, pp. 179–186 (1992).

Brunauer, et al., "Adsorption of Gases in Multimolecular Layers", The Journal of the American Chemical Society, vol. 60, pp. 309–319 (1938).

Barrett, et al., "The Determination of Pore Volume and Area Distributions in Porous Substances. I. Computations from Nitrogen Isotherms", The Journal of the American Chemical Society, vol. 73, pp. 373–380 (1951).

*Primary Examiner*—Pamela R. Schwartz
*Attorney, Agent, or Firm*—Fitzpatrick, Cella, Harper & Scinto

[57] ABSTRACT

Disclosed herein is a recording medium comprising an alumina hydrate having an average pore radius of 20 to 200 Å and a half breadth of pore radius distribution of 20 to 150 Å.

17 Claims, 7 Drawing Sheets

FOREIGN PATENT DOCUMENTS

| | | |
|---|---|---|
| 4-4181 | 1/1992 | Japan . |
| 4-37576 | 2/1992 | Japan . |
| 4-67985 | 3/1992 | Japan . |
| 4-67986 | 3/1992 | Japan . |
| 4267180 | 9/1992 | Japan . |
| 5-16015 | 1/1993 | Japan . |
| 5-16517 | 1/1993 | Japan . |
| 5-32037 | 2/1993 | Japan . |

INK-JET RECORDING MEDIUM

BACKGROUND OF THE INVENTION

1. Field of the Invention

The present invention relates to a recording medium suitable for use in recording using water-based inks, ink-jet recording method and a dispersion. In Particular, this invention relates to a recording medium which can provide images high in optical density, bright in color tone and high in resolution, and has excellent ink-absorbing capacity, an ink-jet recording method using such a recording medium, and a dispersion of an alumina hydrate, which is suitable for use in production of the recording medium.

2. Related Background Art

In recent years, an ink-jet recording system, in which minute droplets of an ink are flown by any of various working principles to apply them to a recording medium such as paper, thereby conducting recording of images, characters and/or the like, has been quickly spread as a recording apparatus for various images in various applications including information instruments because it has features that recording can be conducted at high speed and with a low noise, color images can be formed with ease, recording patterns are very flexible, and development and fixing process are unnecessary. Further, it begins to be applied to a field of recording of full-color images because images formed by an multi-color ink-jet recording system are comparable in quality with multi-color prints by a plate making system and photoprints by a color photographic system, and such records can be obtained at lower cost than the usual multi-color prints and photoprints when the number of copies is small. With the improvement in recordability, such as speeding up and high definition of recording, and multi-coloring of images, recording apparatus and recording methods have been improved, and recording media have also been required to have higher properties.

In order to satisfy such requirements, a wide variety of recording media have been proposed. For example, Japanese Patent Application Laid-Open No. 52-53012 discloses paper for ink-jet, in which a base paper web low in sizing degree is impregnated with a surface coating. Japanese Patent Application Laid-Open No. 53-49113 discloses paper for ink-jet, in which a sheet containing urea-formalin resin powder therein is impregnated with a water-soluble polymer. Japanese Patent Application Laid-Open No. 55-5830 discloses paper for ink-jet recording, in which a coating layer having good ink absorptiveness is provided on a surface of a base. Japanese Patent Application Laid-Open No. 55-51583 discloses that amorphous silica is used as a pigment in a coating layer. Japanese Patent Application Laid-Open No. 55-146786 discloses that a coating layer formed of a water-soluble polymer is used.

In U.S. Pat. Nos. 4,879,166 and 5,104,730, and Japanese Patent Application Laid-Open Nos. 2-276670, 4-37576 and 5-32037, there have been proposed recording sheets having a layer using an alumina hydrate of a pseudoboehmite structure.

As described in U.S. Pat. Nos. 4,374,804 and 5,104,730, and Japanese Patent Application Laid-Open Nos. 58-110287 and 4-37576, it has also been conducted to form an ink-receiving layer of a multi-layer structure using a silica or alumina material.

However, the conventional recording media have involved the following problems:

1) U.S. Pat. No. 5,104,730, and Japanese Patent Application Laid-Open Nos. 2-276670, 2-276671 and 3-275378 disclose recording media having extremely narrow distribution of pore radius. As disclosed in Japanese Patent Application Laid-Open Nos. 4-267180 and 5-16517, however, individual dyes for inks (cyan, magenta, yellow and black) and solvents for the inks are selectively adsorbed in pores of a specific size. Therefore, bleeding may occur on prints if the composition of ink is changed.

The bleeding refers to a phenomenon that edges of boundaries of multi-color printed areas can not be resolved because of feathering caused when ink is still fluid before it is fixed in the ink-receiving layer.

2) U.S. Pat. No. 5,104,730, and Japanese Patent Application Laid-Open Nos. 2-276670, 2-276671 and 3-275378 disclose recording media having pore radius distribution as narrow as 10 to 30 Å in average pore radius. In this pore radius distribution, dye adsorptiveness is good, while the absorptiveness of solvent is insufficient, resulting in the occurrence of beading.

The beading mentioned in the present invention refers to a phenomenon in which dots irregularly move in the plane direction of the surface of an ink-receiving layer when ink is still fluid before it is fixed in the ink-receiving layer, thus forming new aggregates together with adjacent dots to cause an unevenness in the density of recorded images.

3) In printing of color images, inks increase in quantity. The inks printed cannot be completely absorbed in pores, but run out on the surface of an ink-receiving layer, so that bleeding occurs, resulting in deterioration in print quality.

4) High-speed printing requires to have good drying ability. However, absorbing rate is insufficient, and the printed surface is hence not dry when discharged out of a printing apparatus, so that output images may be possibly impaired by contact.

5) There is a problem that the solids concentration of a dispersion of a pigment or the like cannot be increased because the viscosity of the dispersion increases with time, resulting in a failure to apply it. As a measure for the solution of the problem, Japanese Patent Application Laid-Open No. 4-67986 discloses a process in which the polymerization degree of a polymer as a binder is lowered. However, this process involves problems of defective appearance such as cracking in an ink-receiving layer, reduction in water fastness, and the like, and hence still requires a further improvement.

6) There is a problem that since the viscosity of the dispersion is high, its solids concentration cannot be increased. As a measure for the solution of the problem, Japanese Patent Application Laid-Open No. 4-67985 discloses a process in which an acid such as a monocarboxylic acid is added as a dispersant. However, this process is accompanied by productive problems that offensive odor is given, and corrosion is caused.

7) In order to improve ink absorptiveness and resolution of images, U.S. Pat. Nos. 4,780,356, 4,374,804 and 5,104,730, Japanese Patent Publication No. 3-72460, and Japanese Patent Application Laid-Open Nos. 55-11829, 58-110287, 62-270378 and 4-37576 disclose a process in which an ink-receiving layer of a two or more multi-layer structure is formed. However, the process involves a problem that coating and drying must be conducted at least twice for forming the ink-receiving layer, and so the number of processes increases. In addition, since the physical property values of the individual layers are different from each other, there are also problems of changes with time, defective appearance such as cracking in the ink-receiving layer, and separation and peeling of the layers from each other upon printing or the like.

8) Japanese Patent Application Laid-Open No. 3-281384 discloses an alumina hydrate forming an aggregate like a needle, which is in the form of a column having an aspect ratio of not higher than 3 and unidirectionally oriented, and a process for forming an ink-receiving layer using the alumina hydrate. However, since particles of the alumina hydrate are oriented and compacted, spaces among the alumina hydrate particles in the ink-receiving layer tends to narrow. Therefore, the pore radius is partial to a narrow side, and distribution of pore radius has a tendency to narrow. As a result, there is a problem that beading occurs as described above.

SUMMARY OF THE INVENTION

The present invention has thus been made with a view toward solving the above problems and has as its object the provision of a recording medium which can be suited to inks of various compositions, is excellent in ink absorptiveness, can suppress feathering or bleeding of print and occurrence of beading and can provide images high in optical density, and an ink-jet recording method using this recording medium.

Another object of the present invention is to provide a recording medium which can effectively adsorb or absorb a dye and a solvent, which are components for an ink, and hence permits good coloring and quick drying, and an ink-jet recording method using this recording medium.

A further object of the present invention is to provide a dispersion of a pigment, which is suitable for use in production of the above recording media.

A still further object of the present invention is to provide a recording medium in which both dispersibility of a dispersion for coating and dye-adsorbing ability are satisfied, an ink-jet recording method using the recording medium, and a dispersion suitable for use in production of the recording medium.

The above objects can be achieved by the present invention described below.

According to the present invention, there is thus provided a recording medium comprising an alumina hydrate having an average pore radius of 20 to 200 Å and a half breadth of pore radius distribution of 20 to 150 Å.

According to the present invention, there is also provided a recording medium comprising a base material and an ink-receiving layer which comprises a pigment and a binder and is provided on the base material, wherein the pigment is an alumina hydrate and the ink-receiving layer has an average pore radius of 20 to 200 Å and a half breadth of pore radius distribution of 20 to 150 Å.

According to the present invention, there is further provided a recording medium comprising principally pulp fibers and a filler, wherein the filler comprises an alumina hydrate having an average pore radius of 20 to 200 Å and a half breadth of pore radius distribution of 20 to 150 Å.

According to the present invention, there is still further provided a recording medium comprising an alumina hydrate having at least two peaks in pore radius distribution.

According to the present invention, there is yet still further provided a recording medium comprising a base material and an ink-receiving layer which comprises a pigment and a binder and is provided on the base material, wherein the pigment comprises an alumina hydrate and the ink-receiving layer has at least two peaks in pore radius distribution.

According to the present invention, there is still further provided a recording medium comprising principally pulp fibers and a filler, wherein the filler comprises an alumina hydrate having at least two peaks in pore radius distribution.

According to the present invention, there is yet still further provided a recording medium comprising an alumina hydrate containing 0.01 to 1.00% by weight of titanium dioxide.

According to the present invention, there is yet still further provided a recording medium comprising a base material and an ink-receiving layer which comprises an alumina hydrate containing 0.01 to 1.00% by weight of titanium dioxide and is provided on the base material.

According to the present invention, there is still further provided a recording medium comprising principally pulp fibers and a filler, wherein the filler comprises an alumina hydrate containing 0.01 to 1.00% by weight of titanium dioxide.

According to the present invention, there is yet still further provided an ink-jet recording method comprising ejecting minute droplets of an ink from an orifice to apply the droplets to a recording medium, thereby conducting printing, wherein one of the recording media described above is used as the recording medium.

According to the present invention, there is yet still further provided a dispersion of an alumina hydrate, which is obtained by dispersing an alumina hydrate containing 0.1 to 1.0% by weight of a nitrate anion and having an average pore radius of 20 to 200 Å and a half breadth of pore radius distribution of 20 to 150 Å in deionized water, wherein the dispersion having a solids concentration of 15% by weight has a viscosity of not higher than 75 cP as measured at 20° C. and a shear rate of 7.9 sec$^{-1}$.

According to the present invention, there is yet still further provided a dispersion of an alumina hydrate, which is obtained by dispersing an alumina hydrate containing 0.1 to 1.0% by weight of a nitrate anion and having at least two peaks in pore radius distribution in deionized water, wherein the dispersion having a solids concentration of 15% by weight has a viscosity of not higher than 75 cP as measured at 20° C. and a shear rate of 7.9 sec$^{-1}$.

According to the present invention, there is yet still further provided a dispersion of an alumina hydrate, which is obtained by dispersing a titanium dioxide-containing alumina hydrate containing 0.1 to 1.0% by weight of a nitrate anion in deionized water, wherein the dispersion having a solids concentration of 15% by weight has a viscosity of not higher than 75 cP as measured at 20° C. and a shear rate of 7.9 sec$^{-1}$.

DESCRIPTION OF THE PREFERRED EMBODIMENTS

Figure 1:
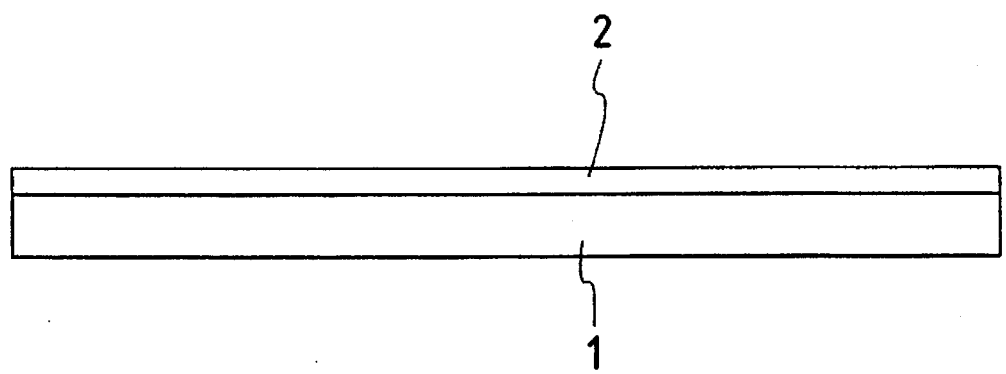
FIG. 1 is a cross-sectional view of a recording medium according to the present invention.

The present invention is directed to a recording medium (first aspect) comprising, as an essential component, at least an alumina hydrate having the average pore radius and half breadth of pore radius distribution within the specific ranges described above, a recording medium (second aspect) comprising, as an essential component, at least an alumina hydrate having the above-described feature in pore radius distribution, and a recording medium (third aspect) comprising, as an essential component, at least an alumina hydrate containing titanium dioxide in the specific amount described above. Each of these recording media is constituted by, for example, internally containing its corresponding alumina hydrate in a sheet such as paper at a stage in which the sheet is formed from a raw material, or forming an ink-receiving layer composed principally of the alumina hydrate and a binder on a base material as illustrated in FIG. 1. The alumina hydrates are most preferable, in particular, as a material used in the ink-receiving layer because it has a positive charge, so that a dye in an ink is well fixed and an image good in coloring is hence provided, and moreover there are no problems of bronzing and light fastness, which have heretofore been caused by the use of silica compounds. A phenomenon called "bronzing" in which the hue of a black recorded area looks brownish has presented itself, and a new problem has hence been offered.

The alumina hydrates used in the recording media according to the present invention may preferably be non-crystalline as analyzed by the X-ray diffraction method.

The alumina hydrate is defined by the following general formula:

$Al_2O_{3-n}(OH)_{2n} \cdot mH_2O$ wherein n is an integer of 0, 1, 2 or 3, m is a number of 0 to 10, preferably 0 to 5. In many cases, $mH_2O$ represents an aqueous phase which does not participate in the formation of a crystal lattice, but is able to eliminate. Therefore, m may take a value other than an integer. Besides, m may take a value of 0 when a material of this kind is calcinated.

The alumina hydrate can be produced by any conventional method such as the hydrolysis of aluminum alkoxide or sodium aluminate. Rocek, et al. [Collect Czech. Chem. Commun., Vol. 56, 1253–1262 (1991)] have reported that the pore structure of aluminum hydroxide is affected by deposition temperature, pH of the solution, aging time and a kind of surfactants used.

For example, KODANSHA LTD PUBLISHERS, "Shokubai Koza (The Catalyst Course)", Vol. 5, Chapter on Engineering, Design of Catalysts, 123 (1985) describes an alumina hydrate as generally having one peak in pore radius distribution. Further, Kobayashi ["Surface", Vol. 15, 282 (1977)] has also reported that an alumina hydrate has one peak in pore radius distribution. Rocek, et al. [Collect Czech. Chem. Commun., 56(6), 1263–1269 (1991)] have reported that aluminum hydroxide deposited at a relatively low temperature of 30° to 50° C. and pH 7 to 8 shows a two-peak porous structure having peaks in a large pore region and a medium pore region.

The shape of the alumina hydrate used in the present invention is preferably in the form of a flat plate and has an average aspect ratio of 3 to 10 and a slenderness ratio of a flat plate surface of 0.6 to 1.0. The definition of the aspect ratio can be given by the method described in Japanese Patent Publication No. 5-16015. The aspect ratio is expressed by a ratio of "diameter" to "thickness" of a particle. The term "diameter" as used herein means a diameter of a circle having an area equal to a projected area of the particle, which has been obtained by observing the alumina hydrate through a microscope or a TEM. The slenderness ratio means a ratio of a minimum diameter to a maximum diameter of the flat plate surface when observed in the same manner as in the aspect ratio. If the average aspect ratio is lower than the lower limit of the above range, the range of the pore radius distribution of the ink-receiving layer narrows. On the other hand, average aspect ratios higher than the upper limit of the above range makes it difficult to produce the alumina hydrate with its particle size even. If the average slenderness ratio is lower than the lower limit of the above range, the range of the pore radius distribution similarly narrows. As described in the literature [Rocek J., et al., Applied Catalysis, Vol. 74, 29–36 (1991)], it is generally known that pseudoboehmite among alumina hydrates has both needle form and another form.

Figure 4:
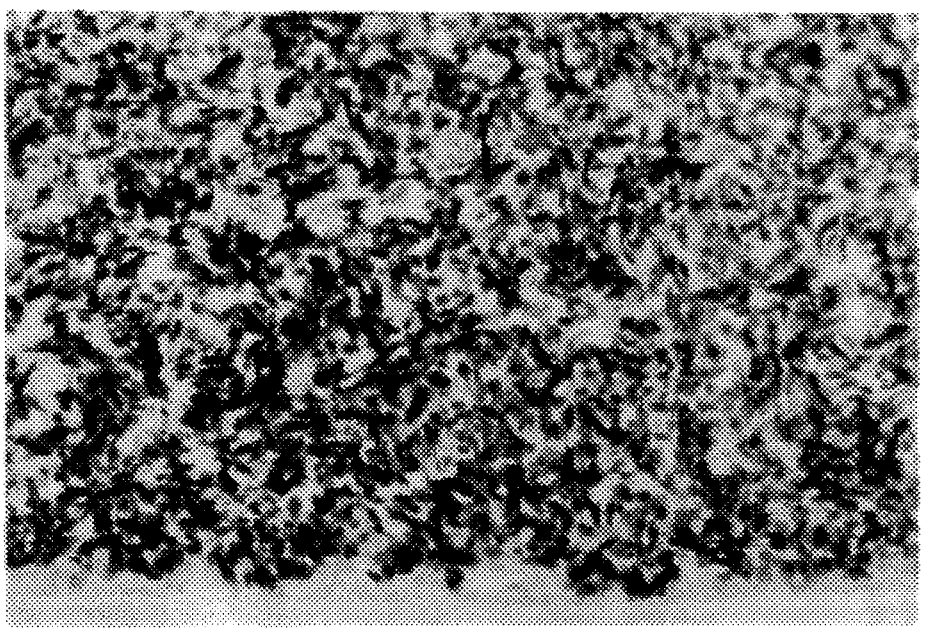
FIG. 4 is a photograph illustrating the structure of particles of the alumina hydrate in an ink-receiving layer according to the present invention, viewed from the section of the ink-receiving layer.

According to a finding of the present inventor, the alumina hydrate in a flat plate form is more preferred because it has better dispersibility than that of a needle form (the ciliary form), and the orientation of particles of the alumina hydrate becomes random as illustrated in the photograph in FIG. 4 when forming an ink-receiving layer, so that the range of the pore radius distribution widens.

In Handbook of Paper Processing, p. 402, there is described particles of aluminum hydroxide as being in the form of a hexagonal flat plate. Besides this, alumina hydroxides such as HIGILITE (trade name, product of Showa Denko K. K.) and HYDRAL (trade name, product of ALCOA) are known. Further, Japanese Patent Application Laid-Open No. 2-276670 discloses an alumina sol in the form of a needle having an aspect ratio of 2 to 10, while Japanese Patent Application Laid-Open No. 3-285814 discloses a boehmite sol in the form of a plate having an aspect ratio of 2 to 10. However, none of these documents disclose a relationship between the shape of the alumina hydrate and the pore structure or dispersibility of particles thereof as described below.

The BET surface area of each of the alumina hydrates, the pore radius distributions of the alumina hydrate and the ink-receiving layer containing the alumina hydrate, and pore volumes and isothermal adsorption and desorption curves as described below can be obtained at the same time by the nitrogen adsorption and desorption method. The BET specific surface areas of the alumina hydrates used in the present invention may preferably be within a range of from 70 to 300 m²/g. If the BET specific surface area is smaller than the lower limit of the above range, the pore radius distribution is partial to a large side. As a result, a dye in an ink cannot be fully adsorbed and fixed. On the other hand, surface areas greater than the upper limit of the above range result in failures to apply the pigment with good dispersibility and hence to control the pore radius distribution.

No particular limitation is imposed on the production process of the alumina hydrates used in the present invention. However, it is preferable to use a process capable of producing a non-crystal alumina hydrate. For example, either of the Bayer's process or the alum pyrolysis process may be used.

As a process for the production of the non-crystal alumina hydrate, which can be particularly preferably used in the present invention, may be mentioned a process in which an acid is added to an aluminum long-chain alkoxide to hydrolyze the alkoxide, thereby obtaining an alumina hydroxide. The term "aluminum long-chain alkoxide" as used herein means an alkoxide having, for example, 5 or more carbon atoms. Further, the use of an alkoxide having 12 to 22 carbon atoms is preferred because the removal of alcohol formed and the shape control of the alumina hydrate can be conducted with ease. The process has an advantage that impurities such as various ions are hard to get mixed compared with the process for producing alumina hydrogel or cationic alumina. The aluminum long-chain alkoxide also has an advantage that since the alcohol formed is easy to remove after the hydrolysis, the removal of the alcohol from the alumina hydrate can be completely conducted compared with the case where a short-chain alkoxide such as aluminum isopropoxide is used. Further, in the process making use of the aluminum long-chain alkoxide, particles of the alumina hydrate obtained by the hydrolysis tend to be in the form of a flat plate, and so the shape of the particles is easy to control. In this process, it is preferable from a viewpoint of obtaining the non-crystal alumina hydrate to preset the pH of a solution to 6 or lower upon the initiation of the hydrolysis. If the pH is more than 8, the alumina hydrate to be finally obtained will become crystalline.

The alumina hydrate used in the first aspect of the present invention obtained by the above process is subjected to a hydrothermal synthesis to grow its particles (aging process). The conditions of the aging process can be suitably adjusted to control the pore form of the alumina hydrate particles within a specific range. If the time of the aging is too short, primary particles of the alumina hydrate, which are relatively uneven in particle size, grow, and so the sizes of spaces among the primary particles, which the spaces define pores, become uneven. As a result, it is considered that the range of pore radius distribution widens. The correlation between the degree of unevenness of the primary particles and the range of the pore radius distribution is unclear. The sol obtained may be used as a dispersion as it is as disclosed in Japanese Patent Application Laid-Open No. 2-276670. In the present invention, it is however preferable to dry the sol once into powder by a method such as spray drying and then prepare a dispersion. In this case, the dispersibility of the alumina hydrate in water is more enhanced.

The best feature of the alumina hydrate used in the third aspect of the present invention is to contain titanium dioxide in a specific proportion. The content thereof is preferably within a range of from 0.01 to 1.00 by weight, more preferably from 0.13 to 1.00% by weight. Further, the valence of titanium in the titanium dioxide is preferably +4.

According to another finding of the present inventor, the titanium dioxide contained exists on the surface of the alumina hydrate in the form of such ultrafine particles that they cannot be observed through an electron microscope of 500,000 magnifications, and serves as an adsorption site upon the adsorption of the dye in the ink. The reason of that is not clearly understood. As reported by Yang, et al. [React. Kinet. Catal. Lett., 46(1), 179–186 (1992)], it is however inferred that twisted sites containing strongly electron-acceptable $Al^{3+}$ are formed by the addition of titanium dioxide, and the dye-adsorbing ability is hence improved, or the titanium ion of titanium dioxide forms a coordinate bond with the dye.

According to a further finding of the present inventor, the valence of the titanium is +4 judged from the value of bound energy by the observation of ESCA. Since no splitting occurs on 3p peak for titanium and 2p peak for aluminum, there is no interaction between titanium and aluminum. Namely, titanium dioxide solely exists without interacting between titanium and aluminum. When the surface of the titanium dioxide-containing alumina hydrate is etched with argon, the amount of titanium is decreased to half in the etching time of about 100 seconds. No titanium is detected in the etching time of about 500 seconds. Therefore, the titanium dioxide exists only in the vicinity of the surfaces of the alumina hydrate particles without affecting the surface charge of the alumina hydrate under the conditions of the particle size, valence and splitting of peaks, so that the dispersibility of the alumina hydrate is not impaired.

If the valence of titanium in the titanium dioxide becomes lower than +4, the titanium dioxide comes to serve as a catalyst by light irradiation and the binder is hence deteriorated, so that cracking and dusting tends to occur. The alumina hydrate used in the third aspect of the present invention may contain the titanium dioxide either only in the vicinity of the surfaces of the alumina hydrate particles or up to the interiors thereof. Its content may be changed from the surface to the interior. As demonstrated in Examples of the present invention, which will be described subsequently, the titanium dioxide may preferably be contained only in the close vicinity of the surfaces of the particles because the bulk properties of the interior of the alumina hydrate are easy to be kept in the vicinity of the surface, thereby undergoing no change in dispersibility.

Although oxides of magnesium, calcium, strontium, barium, zinc, boron, silicon, germanium, tin, lead, zirconium, indium, phosphorus, vanadium, niobium, tantalum, chromium, molybdenum, tungsten, manganese, iron, cobalt, nickel, ruthenium and the like may be used instead of the titanium dioxide. However, the titanium dioxide is most preferred from the viewpoint of the adsorptiveness of a dye in an ink and dispersibility. Most of the oxides of the above-mentioned metals are colored, while the titanium dioxide is colorless. From this point, the titanium dioxide is also preferred.

The titanium dioxide-containing alumina hydrate used in the third aspect of the present invention may preferably be of a non-crystalline structure as analyzed by the X-ray diffraction method.

As a process for producing the titanium dioxide-containing alumina hydrate, a process in which a liquid mixture of an aluminum alkoxide and a titanium alkoxide is hydrolyzed is most preferred because the particle size of titanium dioxide can be made small and is easy to control. The particle size and shape in this process are discussed in the form of an $Ni/Al_2O_3$ catalyst by an alkoxide process in, for example, Gakkai Shuppan Center, "Science of Surfaces", edited by Kenji Tamaru, 327 (1985). As another process, its production may also be conducted by adding an alumina hydrate as a nucleus for crystal growth upon the hydrolysis of the mixture of the aluminum alkoxide and the titanium alkoxide. In this process, the titanium dioxide exists only in the vicinity of the surface of the alumina hydrate.

Materials with a variety of materials supported on surfaces of particles such as alumina are widely known in the field of catalysts. Titanium dioxide is poor in solubility in solvents such as water, and hence extremely hard to be supported on alumina or the like. It is known to support titanium as a soluble salt on the surfaces of alumina hydrate particles. It is however difficult to convert the titanium compound supported on the surfaces of the hydrate particles to titanium dioxide and also to remove the counter ion component by which the titanium salt has been formed. In general, the valence of the titanium compound supported is smaller than +4. Therefore, the valence of titanium as determined by ESCA is not +4 like the titanium dioxide-containing alumina hydrate according to the third aspect of the present invention.

Dispersions of the above-described alumina hydrates used in the first to third aspects of the present invention may be used either as an additive (for example, added to a pulp slurry upon the preparation of a raw material for paper making) upon the production of the respective recording media, more specifically, upon the production of paper, or as a coating dispersion for forming an ink-receiving layer on a base material.

In the recording medium used in the first to third aspects of the present invention according to an embodiment of the present invention, a Coating dispersion (a dispersion of the alumina hydrate) containing the alumina hydrate as a pigment and a binder is applied to a base material to form an ink-receiving layer. The values of physical properties of the ink-receiving layer are not determined only by the alumina hydrate, but changed by various production conditions such as the kind and mixing amount of the binder, the concentration, viscosity and dispersion state of the coating dispersion, coating equipment, coating head, coating weight, and the flow rate, temperature and blowing direction of drying air. It is therefore necessary to control the production conditions within the optimum limits for achieving the properties of the ink-receiving layer according to the present invention.

The alumina hydrate used in the first aspect of the present invention is wide in the half breadth of pore radius distribution, which will be described subsequently, and is dispersed up to a level of primary particles in a dispersion for coating. Such wide pore radius distribution is substantially kept even after the formation of the ink-receiving layer through steps of dispersion of the alumina hydrate, coating on the base material and drying. The reason of this is not clearly understood. The present inventor however dares to explain for facilitating the understanding of the present invention, and infers that a pore structure is defined principally by spaces among the primary particles of the alumina hydrate, and the alumina hydrate particles in the form of a flat plate are oriented at random in the ink-receiving layer, or that the wide pore radius distribution attributable to the unevenness of the particle size of the alumina hydrate is kept even in the ink-receiving layer.

The average pore radius of the ink-receiving layer is preferably within a range of from 20 to 200 Å, while its half breadth of pore radius distribution is preferably within a range of from 20 to 150 Å, more preferably from 80 to 150 Å. The term "half breadth of pore radius distribution" as used herein means a breadth of pore radius which is a magnitude half of the magnitude of the average pore radius. If the average pore radius is larger than the upper limit of the above range, the resulting recording medium is deteriorated in the adsorption and fixing of a dye in an ink, and so bleeding tends to occur on images. If the average pore radius is smaller than the lower limit of the above range, the resulting recording medium is deteriorated in ink absorptiveness, and so beading tends to occur. On the other hand, if the half breadth is outside of this range, the resulting recording medium is deteriorated in the adsorption of a dye or a solvent in an ink.

As with the ink-receiving layer, the pore radius distribution of the alumina hydrate making up the ink-receiving layer preferably has an average pore radius of 20 to 200 Å and a half breadth of pore radius distribution of 20 to 150 Å. The pore radius distribution of the ink-receiving layer depends upon the pore radius distribution of the alumina hydrate. Therefore, if the pore radius distribution of the alumina hydrate is outside the above range, the pore radius distribution of the ink-receiving layer cannot be controlled within the above range.

In the first aspect, the pore volume of the ink-receiving layer is preferably within a range of from 0.4 to 0.6 cc/g. If the pore volume of the ink-receiving layer is greater than the upper limit of the above range, cracking and dusting occur on the ink-receiving layer. If the pore volume is smaller than the lower limit of the above range, the resulting recording medium is deteriorated in ink absorption. The total pore volume of the ink-receiving layer is more preferably at least 8 cc/m$^2$. If the total pore volume is smaller than this limit, inks tend to run out of the ink-receiving layer when multi-color printing is conducted, and so bleeding occurs on images. As with the ink-receiving layer, the pore volume of the alumina hydrate making up the ink-receiving layer is preferably within a range of from 0.4 to 0.6 cc/g. If the pore volume of the alumina hydrate is outside the above range, the pore volume of the ink-receiving layer cannot be controlled within the above range.

The alumina hydrate obtained by the above process is subjected to a hydrothermal synthesis, thereby its particles grow (an aging step). By controlling the conditions of this step, the pore form of the alumina hydrate particles can be controlled within a specified range. Upon setting an aging time suitable, primary particles of the alumina hydrate having relatively even particle size grow, so that the sizes of spaces among the primary particles, which define pores, become even and the range of pore radius distribution becomes narrow. If the aging time is made longer than that conditions, the alumina hydrate having two tops in the pore radius distribution can be obtained. As a result, a recording medium, in which two tops are made in the pore radius distribution of alumina hydrate, can be obtained. The sol obtained may be used as a dispersion as it is as disclosed in Japanese Patent Application Laid-Open No. 2-276670. In the present invention, it is however preferable to dry the sol once into powder by a method such as spray drying and then prepare a dispersion. In this case, the dispersibility of the alumina hydrate in water is more enhanced.

The alumina hydrate obtained by the process has two or more peaks in a pore radius distribution. A pore structure is mainly formed by spaces among the primary structure is mainly formed by spaces among the primary particles of the alumina hydrate. The reason why the pore radius distribution has at least two peaks is considered to be as follows. Since the alumina hydrate particles are in the form of a flat plate and the primary particles are oriented at random in the dried powder, there are defined spaces of portions in which primary particles overlap with each other in a direction of the principal plain of the flat plate and spaces of another portions in which an end face and the principal plane or another end face overlap with each other. Thus, two or more peaks in the pore radius distribution are all caused by the spaces among the primary particles, and at least one of the pore radii at one peak becomes smaller than the minor axis or major axis radius of the flat plate surface of the primary particles, while at least one of the pore radii at another peaks becomes about several times the minor axis or major axis radius of the flat plate surface.

Figure 3:
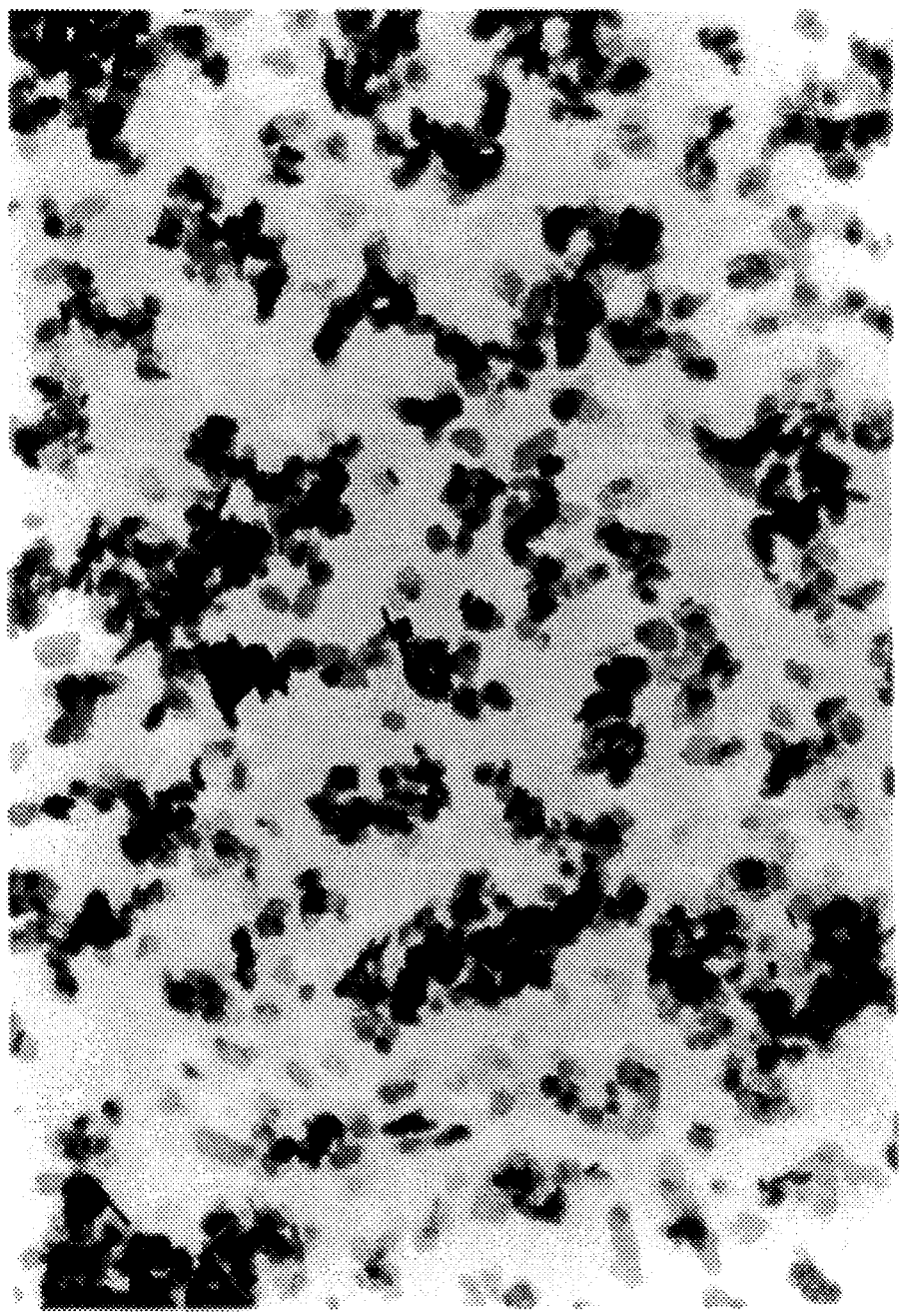
FIG. 3 is a photograph illustrating a crystal structure of the alumina hydrate according to the present invention.

The alumina hydrate of the present invention is, as described above, has at least two peaks in the pore radius distribution. Althogh such the alumina hydrate is dispersed up to a level of primary particles in a dispersion for coating, the radius distribution having at least one peaks is kept substantially even when the ink-receiving layer is formed through the steps of dispersing of the alumina hydrate, coating onto a substrate and drying. The reason is considered as follows: Even in an ink-receiving layer, the primary particles of the alumina hydrate are oriented in random direction, as shown by the photograph in FIG. 3, and therefore, as same as in a case of titanium dioxide-containing alumina hydrate, there are generated spaces of portions in which primary particles overlap with each other in a direction of the principal plain of the flat plate through a binder and spaces of another portions in which an end face and the principal plane or another end fade overlap with each other through a binder, by which the pore radius distribution having two or more peaks is kept even when the ink-receiving layer is formed therefrom.

Japanese Patent Application Laid-Open No. 58-110287 discloses a recording sheet having peaks of pore radius at 0.05 µm or smaller and a range of from 0.2 to 10 µm. However, the former peak is caused by the spaces among primary particles, while the latter peak is defined by the spaces among secondary, tertiary or higher-order particles aggregated by the primary particles. Therefore, this sheet is different from the recording medium according to the second aspect of the present invention, in which said at least two peaks are caused by the spaces among primary particles. Accordingly, the positions of the peaks of the pore radii are quite different from those of the second aspect of the present invention.

In the recording medium according to the second aspect of the present invention, the ink-receiving layer also has at least two peaks in the pore radius distribution. The solvent component in an ink is absorbed by relatively large pores, while the dye in the ink is adsorbed by relatively small pores. The pore radius corresponding to one of the peaks is preferably smaller than 100 Å, more preferably 10 to 60 Å. The pore radius corresponding to another peak is preferably within a range of from 100 to 200 Å. If the pore radius corresponding to the former peak is larger than the above limit, the resulting recording medium is deteriorated in the adsorption and fixing of the dye in the ink, and so bleeding and beading occur on images. If the pore radius corresponding to the latter peak is smaller than the lower limit of the above range, the resulting recording medium is deteriorated in the absorption of the solvent component in the ink, so that the ink is not well dried, and the surface of the ink-receiving layer remains wet even when the medium is discharged out of a printer after printing. If the pore radius corresponding to the latter peak is greater than the upper limit of the above range, the resulting ink-receiving layer tends to crack.

In the second aspect of the present invention, the alumina hydrate also has at least two peaks in the pore radius distribution. As with the ink-receiving layer, in the pore radius distribution, the pore radius corresponding to one of relatively small peaks is preferably smaller than 100 Å, more preferably 10 to 60 Å. The pore radius corresponding to a relatively large peak is preferably within a range of from 100 to 200 Å. As described above, the pore structure is defined by the primary particles of the alumina hydrate. The nature of this pore structure is already created by the alumina hydrate. Therefore, if the pore radii corresponding to the peaks of the pore radius distribution of the alumina hydrate are outside the above ranges, the pore radii corresponding to the peaks of the pore radius distribution of the ink-receiving layer cannot be controlled within the above range.

In the second aspect, the pore volume of the ink-receiving layer is preferably within a range of from 0.1 to 1.0 cc/g, more preferably from 0.4 to 0.6 cc/g. If the pore volume of the ink-receiving layer is greater than the upper limit of the above range, cracking and dusting occur on the ink-receiving layer. If the pore volume is smaller than the lower limit of the above range, the resulting recording medium is deteriorated in ink absorption. The total pore volume of the ink-receiving layer is more preferably at least 8 cc/m$^2$. If the total pore volume is smaller than this limit, inks tend to run out of the ink-receiving layer when multi-color printing is conducted, and so bleeding occurs on images. The pore volume of pores having a peak at a pore radius of smaller than 100 Å is preferably within a range of from 0.1 to 10% by volume, more preferably from 1 to 5% by volume based on the total pore volume.

The pore volume of the pores having the peak at a pore radius of smaller than 100 Å means a pore volume within a range showing a breadth of pore radii having a magnitude half of the greatest-magnitude pore radius of the pores having a peak at smaller than 100 Å in the pore radius distribution. If the pore volume of the pores having a peak at a pore radius of smaller than 100 Å in the ink-receiving layer is smaller than the lower limit of the above range, the resulting recording medium is deteriorated in adsorption of a dye in an ink. If the pore volume exceeds the upper limit of the above range, the resulting recording medium is deteriorated in the absorption of the solvent component in the ink. The pore volume of the alumina hydrate is also preferably within a range of from 0.1 to 1.0 cc/g, more preferably from 0.4 to 0.6 cc/g. The pore volume of pores having a peak at a pore radius of smaller than 100 Å is preferably within a range of from 0.1 to 10% by volume, more preferably from 1 to 5% by volume based on the total pore volume. The pore volume of the ink-receiving layer depends upon the pore volume of the alumina hydrate. Therefore, if the pore volume of the alumina hydrate is outside the above range, the pore volume of the ink-receiving layer cannot be controlled within the above range.

In the third aspect of the present invention, the titanium dioxide-containing alumina hydrate is wide in the half breadth of pore radius distribution as described below. Such an alumina hydrate is dispersed up to a level of primary particles in a dispersion for coating. Such wide pore radius distribution is substantially kept even after the formation of the ink-receiving layer through steps of dispersion of the alumina hydrate, coating on the base material and drying. The reason of this is not clearly understood, but is considered to be as described above.

The average pore radius of the ink-receiving layer is preferably within a range of from 20 to 200 Å, while its half breadth of pore radius distribution is preferably within a range of from 20 to 150 Å, more preferably from 80 to 150 Å.

If the average pore radius is larger than the upper limit of the above range, the resulting recording medium is deteriorated in the adsorption and fixing of a dye in an ink, and so bleeding tends to occur on images. If the average pore radius is smaller than the lower limit of the above range, the resulting recording medium is deteriorated in ink absorptiveness, and so beading tends to occur. On the other hand, if the half breadth is outside of this range, the resulting medium is deteriorated in the adsorption of a dye or a solvent system. As with the ink-receiving layer, the pore radius distribution of the alumina hydrate preferably has an average pore radius of 20 to 200 Å and a half breadth of pore radius distribution of 20 to 150 Å. The pore radius distribution of the ink-receiving layer depends upon the pore radius distribution of the alumina hydrate. Therefore, if the pore radius distribution of the alumina hydrate is outside the above range, the pore radius distribution of the ink-receiving layer cannot be controlled within the above range.

The pore volume of the ink-receiving layer is preferably within a range of from 0.4 to 0.6 cc/g. If the pore volume of the ink-receiving layer is greater than the upper limit of the above range, cracking and dusting occur on the ink-receiving layer. If the pore volume is smaller than the lower limit of the above range, the resulting recording medium is deteriorated in ink absorption. The total pore volume of the ink-receiving layer is more preferably at least 8 cc/m$^2$. If the total pore volume is smaller than this limit, inks tend to run out of the ink-receiving layer when multi-color printing is conducted, and so bleeding occurs on images. As with the ink-receiving layer, the pore volume of the alumina hydrate is preferably within a range of from 0.4 to 0.6 cc/g. If the pore volume of the alumina hydrate is outside the above range, the pore volume of the ink-receiving layer cannot be controlled within the above range.

In the preferred embodiment, the titanium dioxide-containing alumina hydrate has at least two peaks in the pore radius distribution. The alumina hydrate is dispersed up to a level of primary particles in a dispersion for coating. The pore radius distribution having at least two peaks is not lost at all even when the ink-receiving layer is formed therefrom. Such pore structure as described above is defined principally by spaces among the primary particles of the alumina hydrate. The reason why the pore radius distribution has at least two peaks is considered to be as described above. As described above, pores corresponding to said at least two peaks in the pore radius distribution are all caused by the spaces among the primary particles. At least one of the pore radii at one peak becomes smaller than the minor axis or major axis radius of the flat plate surface of the primary particles, while at least one of the pore radii at another peak becomes about several times the minor axis or major axis radius of the flat plate surface.

In the third aspect of the present invention, the ink-receiving layer also has at least two peaks in the pore radius distribution. The solvent component in an ink is absorbed by relatively large pores, while the dye in the ink is adsorbed by relatively small pores. The pore radius corresponding to one of relatively small peaks is preferably smaller than 100 Å, with 10 to 60 Å being more preferred because the dye-adsorbing ability is markedly improved. The pore radius corresponding to a relatively large peak is preferably within a range of from 100 to 200 Å because the rate of absorption of the solvent becomes fast. If the pore radius corresponding to the relatively small peak is larger than the above limit, the resulting recording medium is deteriorated in the adsorption and fixing of the dye in the ink, and so bleeding and beading occur on images. If the pore radius corresponding to the relatively large peak is smaller than the lower limit of the above range, the resulting recording medium is deteriorated in the absorption of the solvent component in the ink, so that the ink is not well dried, and the surface of the ink-receiving layer remains wet even when the medium is discharged out of a printer after printing. If the pore radius corresponding to the latter peak is greater than the upper limit of the above range, the resulting ink-receiving layer tends to crack.

In the third aspect of the present invention, the alumina hydrate also has at least two peaks in the pore radius distribution. As with the ink-receiving layer, in the pore radius distribution, the pore radius corresponding to one of relatively small peaks is preferably smaller than 100 Å, more preferably 10 to 60 Å. The pore radius corresponding to a relatively large peak is preferably within a range of from 100 to 200 Å. As described above, the pore structure is defined by the primary particles of the alumina hydrate. The nature of this pore structure is already created by the alumina hydrate. Therefore, if the pore radii corresponding to the peaks of the pore radius distribution of the alumina hydrate are outside the above ranges, the pore radii corresponding to the peaks of the pore radius distribution of the ink-receiving layer cannot be controlled within the above range.

In the third aspect, the pore volume of the ink-receiving layer is preferably within a range of from 0.1 to 1.0 cc/g, more preferably from 0.4 to 0.6 cc/g. If the pore volume of the ink-receiving layer is greater than the upper limit of the above range, cracking and dusting occur on the ink-receiving layer. If the pore volume is smaller than the lower limit of the above range, the resulting recording medium is deteriorated in ink absorption. The total pore volume of the ink-receiving layer is more preferably at least 8 cc/m$^2$. If the total pore volume is smaller than this limit, inks tend to run out of the ink-receiving layer when multi-color printing is conducted, and so bleeding occurs on images. The pore volume of pores having a peak at a pore radius of smaller than 100 Å is preferably within a range of from 0.1 to 10% by volume, more preferably from 1 to 5% by volume based on the total pore volume.

As with the ink-receiving layer, the pore volume of the alumina hydrate is also preferably within a range of from 0.1 to 1.0 cc/g, more preferably from 0.4 to 0.6 cc/g. Further, the pore volume of pores having a peak at a pore radius of smaller than 100 Å is preferably within a range of from 0.1 to 10% by volume, more preferably from 1 to 5% by volume based on the total pore volume. The pore volume of the ink-receiving layer depends upon the pore volume of the alumina hydrate. Therefore, if the pore volume of the alumina hydrate is outside the above range, the pore volume of the ink-receiving layer cannot be controlled within the above range.

In the recording media according to the first to third aspect of the present invention, which each have an ink-receiving layer on a base material, a relative pressure difference ($\Delta P$) between adsorption and desorption at 90 percent of the maximum amount of adsorbed gas as found from an iso-thermal nitrogen adsorption and desorption curve for the ink-receiving layer, which is derived from the nitrogen adsorption and desorption method, is preferably not larger than 0.2, more preferably not larger than 0.15, most preferably not larger than 0.10. As described in McBain [J. Am. Chem. Soc., Vol. 57, 699 (1935)], the relative pressure difference ($\Delta P$) can be used as an index whether a pore in the form of an inkpot may exist. The pore is closer to a straight tube as the relative pressure difference ($\Delta P$) is smaller. On the other hand, the pore is closer to an inkpot as the difference is greater. Differences exceeding the above limit result in a recording medium poor in dryness of an ink after printing. Japanese Patent Application Laid-Open No. 60-245588 describes the fact that with respect to the shape of pores in an alumina xerogel used in an ink-receiving layer, those low in degree of labyrinth, even and linear are preferred, while an inkpot form narrow in inlet, a gourd form constricted in the middle and a winding form are not preferred from the viewpoint of rate of absorption. However, this publication does not disclose anything about specific methods for measuring actual physical properties and the like.

With respect to the above-described alumina hydrates in the recording media according to the first to third aspect of the present invention, a relative pressure difference ($\Delta P$) between adsorption and desorption at 90 percent of the maximum amount of adsorbed gas as found from an isothermal nitrogen adsorption and desorption curve for each of the alumina hydrates, which is derived from the nitrogen adsorption and desorption method, is preferably not larger than 0.2, more preferably not larger than 0.15, most preferably not larger than 0.10. If the difference is outside this limit, the relative pressure difference ($\Delta P$) of the ink-receiving layer as found from the isothermal nitrogen adsorption and desorption curve cannot be controlled within the above limit.

In the recording media according to the first to third aspect of the present invention, the number of hydroxyl groups on the surface of each of the alumina hydrates is preferably at least $10^{20}$ groups/g. If the number is fewer than this value, the solids concentration of a dispersion in which the alumina hydrate is dispersed in water cannot be increased. Such number of hydroxyl groups on the surface of the alumina hydrate can be determined by the titration with a triethylaluminum solution.

The surface potential of each of the alumina hydrates used in the present invention can be determined by a zeta potential analyzer. Japanese Patent Application Laid-Open No. 60-232990 discloses that alumina compounds have a positive charge, and in its Examples, the values of zeta-potentials. However, specific measuring method and conditions are not described therein. The value of a zeta-potential varies depending upon the cell and electrode structure in a measuring apparatus, applied voltage, the solids concentration and pH of a dispersion, and dispersants and additives used. Therefore, absolute values cannot be directly compared unless the measuring conditions, apparatus and the like are standardized to conduct the measurement.

With respect to the alumina hydrates used in the present invention, the zeta-potential is preferably at least 15 mV as measured at pH 6 in the form of a 0.1% by weight aqueous dispersion free from any dispersant and additive. If the zeta-potential is above this limit, the alumina hydrate can be easily dispersed up to a level of primary particles in a dispersion. If the zeta-potential is lower than 15 mV, aggregate and deposit occur as the solids concentration increases, or particles partly aggregate to form great lumps when a binder dispersion is mixed with the alumina hydrate. For this reason, in particular, in the recording media having an ink-receiving layer, pore radius of the ink-receiving layer becomes markedly large, and so the strength of the ink-receiving layer is lowered, resulting in a potential problem that dusting may occur, or dye-fixing ability upon printing may be deteriorated. In general, alumina hydrate is stable in a low pH region. It is therefore known to add an acid to low the pH of the dispersion. However, the addition of the acid is not preferred from the viewpoint of the occurrence of offensive odor and corrosion and of the limitation of the kind of binder used. Further, a known process in which a dispersant is added is not preferred because repellent or the like occurs upon the coating of the dispersion.

On the other hand, if the pH region becomes higher, primary particles aggregate according to the kind of the alumina hydrate to enlarge the particle size, so that the alumina hydrate may apparently have a high zeta-potential in some cases. The zeta-potential recited in the present invention should be measured in a condition that such aggregation of particles does not occur. In order to determine whether such aggregation of particles occurs or not, it is effective to measure the particle size of dispersed particles. Any known method may be used as a measuring method of the particle size. It is necessary to confirm that the particle size of particles in a dispersion kept at pH 6, which is subjected to the measurement of zeta-potential, has substantially the same value as the particle size of particles in a dispersion kept at pH 4 in which the particles are said to be stably dispersed.

In the present invention, a dispersion obtained by dispersing an alumina hydrate containing 0.1 to 1.0% by weight of a nitrate anion, said alumina hydrate being such a specific alumina hydrate as described above, in deionized water to give a solids concentration of 15% by weight preferably has a viscosity of not higher than 75 cP, most preferably not higher than 30 cP as measured at 20° C. and a shear rate of 7.9 sec$^{-1}$. Further, a dispersion obtained by dispersing the same alumina hydrate containing 0.1 to 1.0% by weight of a nitrate anion as described above in deionized water to give a solids concentration of 20% by weight preferably has a viscosity of not higher than 100 cP, most preferably not higher than 80 cP as measured at 20° C. and a shear rate of 10.2 sec$^{-1}$. Furthermore, a dispersion obtained by dispersing the same alumina hydrate containing 0.1 to 1.0% by weight of a nitrate anion as described above in deionized water to give a solids concentration of 25% by weight preferably has a viscosity of not higher than 500 cP, most preferably not higher than 460 cP as measured at 20° C. and a shear rate of 10.2 sec$^{-1}$. In each of the above cases, if the viscosity exceeds the upper limit, the dispersion is required to low its solids concentration. It is not hence preferable from the viewpoint of mass productivity to increase the viscosity beyond the above limit.

The viscosities of the alumina hydrate dispersions according to the present invention can be measured by means of a rotational viscometer, for example, a Brookfield type viscometer.

The prior art making use of the pseudoboehmite cited above and the present invention have been investigated in comparison with each other. As a result, differences therebetween are as follows:

1) With respect to the pore radius distribution in the prior art, the breadth of the pore radius distribution is disclosed only in a narrow range as demonstrated by the fact that the pore volume of pores within a range of the average pore radius±10 Å amounts to 45 to 55% of the total pore volume. On the contrary, the present inventor has found that when the breadth of the pore radius distribution is widened as described herein, print quality remains unchanged even if the proportion of a dye to a solvent in an ink and the composition of materials are changed.

It has also been found that when one gets the pore radius distribution to have at least two peaks to divide the function of the pores, the solvent component in an ink is absorbed in pores having a relatively large radius, while the dye component in the ink is adsorbed on pores having a relatively small radius, whereby a recording medium, by which inks are quickly dried and good coloring is achieved even when a multi-color printing is conducted at high speed, is provided.

2) With respect to the pore radius and pore volume, the prior art describes the total pore volumes as being 0.2 to 1.0 cc/g for pores having a pore radius of 10 to 40 Å, 0.1 to 0.4 cc/g for pores having a pore radius of 40 to 100 Å, and 0.1 cc/g for pores having a pore radius of 100 to 1000 Å. On the contrary, the present inventor has found that when the relationship between the pore volume per unit area of the ink-receiving layer and the isothermal nitrogen adsorption and desorption curve thereof is adjusted within the range described herein, the adsorption and drying of the ink after printing are markedly improved.

3) The prior art describes a pseudoboehmite sol in the form of a needle and a production process of an ink-receiving layer making use of the sol. The shape of the alumina hydrate and the solids concentration of a dispersion are also described. On the contrary, the present inventor has found the use of non-crystal alumina hydrates in the form of "a flat plate".

As described above, such a non-crystal alumina hydrate in the form of a flat plate is produced by hydrolyzing an aluminum long-chain alkoxide. Therefore, it is possible to obtain an alumina hydrate containing little ion and raw alcohol with ease. According to this hydrolysis, the shape control for forming particles of the alumina hydrate into the flat plate can be made with ease. The non-crystal alumina hydrate in the flat plate form has higher dispersibility than the known alumina hydrate in the needle form. Further, the resulting alumina hydrate is dried once to powder without directly preparing a dispersion in a sol state, and then used, whereby a dispersion high in solids concentration and low in viscosity can be prepared with ease.

4) The prior art discloses an alumina hydrate of a pseudoboehmite structure. It is also disclosed to add additives such as silica, boria, titania and magnesia to the alumina hydrate. On the contrary, the present inventor has found that an alumina hydrate containing titanium dioxide has an improving effect on both adsorption of a dye in an ink and dispersibility.

Figure 9A:
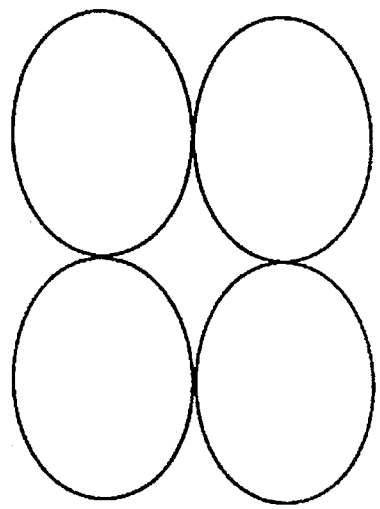
FIGS. 9A and 9B are cross-sectional views illustrating a contained type and a mixed type, respectively, of pore portions in recording media in the third aspect of the present invention.
Figure 9B:
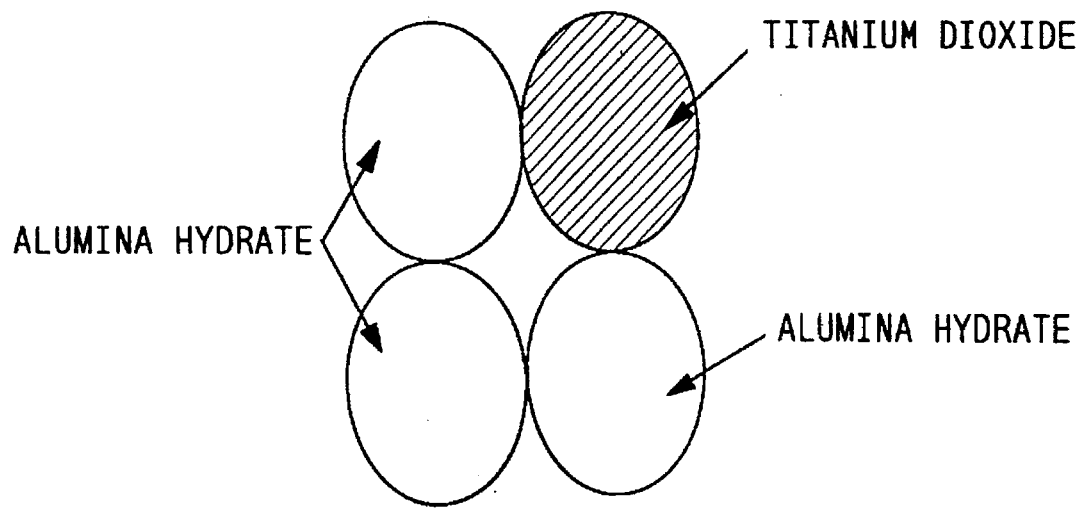

The titanium dioxide-containing alumina hydrate is better in dye-adsorbing ability than alumina hydrate containing no titanium dioxide because the dye is adsorbed on the strongly electron-acceptable $Al^{3+}$ formed by the action of titanium dioxide, or the titanium ion of titanium dioxide forms a coordinate bond with the dye. FIGS. 9A and 9B schematically illustrate exposed states of titanium dioxide in pores in the respective cases where titanium dioxide is internally contained in the alumina hydrate and where titanium dioxide is added (mixed) to the alumina hydrate. In the mixed system, the titanium dioxide is partly exposed in the pore. In the contained system, the titanium dioxide is entirely exposed in the pore. If the titanium dioxide is present in the same proportion, the system according to the present invention is greater on the amount of titanium dioxide exposed.

In the titanium dioxide-containing alumina hydrate used in the present invention, the titanium dioxide exists in the close vicinity of the surface of the alumina hydrate in the form of such ultrafine particles that they cannot be observed even through an electron microscope. Therefore, the surface area of the titanium dioxide in the interior of the pore is considerably great, and an adsorption site hence becomes far greater than the mixed system, whereby the adsorptiveness of a dye in an ink to the alumina hydrate is exhibited to a significant extent.

In the alumina hydrate mixed with titanium dioxide, its surface charge tends to be lost because the surface charges of the alumina hydrate and titanium dioxide are opposite to each other, and hence neutralized. Therefore, the zeta-potential of its dispersion is low, and so the dispersion tends to aggregate. On the contrary, in the titanium dioxide-containing alumina hydrate used in the present invention, the titanium dioxide exists in the close vicinity of the surface of the alumina hydrate in the form of the ultrafine particles, whereby the surface area of the titanium dioxide in the interior of the pore is considerably great, and little influence is exerted on the structure of the alumina hydrate. It also has an effect of lessening the reduction in surface charge of the alumina hydrate. Further, in the present invention, the titanium dioxide exists only in the vicinity of the surface of the alumina hydrate. Therefore, the bulk properties of the interior of the alumina hydrate are easy to be kept, which has an effect of exerting little influence on the surface charge.

The prior art describes a psuedoboehmite sol and a production process of an ink-receiving layer making use of the sol. On the contrary, the non-crystal titanium dioxide-containing alumina hydrates in the form of a flat plate according to the present invention is produced by hydrolyzing, preferably, an aluminum long-chain alkoxide and titanium alkoxide. Therefore, it is possible to obtain an alumina hydrate containing little ion and raw alcohol with ease. According to this process, the alumina hydrate tend to become particles in the form of a flat plate, and shape control can be made with ease. Further, titanium dioxide exists in the close vicinity of the surfaces of the particles, so that the alumina hydrate has far higher dispersibility than the known alumina hydrate in the needle form. Furthermore, the resulting titanium dioxide-containing alumina hydrate is dried once to powder without directly preparing a dispersion (in particular, a dispersion for coating) in a sol state, and then used, whereby a dispersion high in solids concentration and low in viscosity can be prepared with ease.

In each of the recording media according to the present invention, a binder capable of using in combination with the alumina hydrate may be freely selected from water-soluble polymers. For example, preference may be given to polyvinyl alcohol or modified products thereof (cationically modified, anionically modified, silanol modified), starch or modified products thereof (oxidized, etherified), casein or modified products thereof, gum arabic, cellulose derivatives such as carboxymethyl cellulose, hydroxyethyl cellulose and hydroxypropyl cellulose, conjugated diene copolymer latexes such as SBR latexes, NBR latexes and methyl methacrylate-butadiene copolymers, functional group-modified polymer latexes, vinyl copolymer latexes such as ethylene-vinyl acetate copolymers, polyvinyl pyrrolidone, maleic anhydride polymer or copolymers thereof, acrylic ester copolymers, and the like. These binders may be used either singly or in any combination thereof. The mixing ratio of the alumina hydrate to the binder may be optionally selected from a range of from 1:1 to 30:1, preferably from 5:1 to 25:1. If the amount of the binder is less than the lower limit of the above range, the mechanical strength of the resulting ink-receiving layer is insufficient, which forms the cause of cracking and dusting. If the amount is greater than the upper limit of the above range, the pore volume of the resulting ink-receiving layer is reduced, resulting in a recording medium poor in ink absorptiveness.

The alumina hydrate and binder may optionally contain dispersants for the alumina hydrate, viscosity modifiers, pH adjustors, lubricants, flowability modifiers, surfactants, antifoaming agents, water-proofings, foam suppressors, releasing agents, foaming agents, penetrants, coloring dyes, optical whitening agents, ultraviolet absorbents, antioxidants, antiseptics and mildewproofing agents.

The water-proofings may be freely selected for use from the known substances such as quaternary ammonium halides and quaternary ammonium salt polymers.

As the base material constituting the recording medium of the present invention, may be used paper webs such as suitably sized paper, water leaf paper and resin-coated paper making use of polyethylene or the like, sheet-like substance such as thermoplastic films, and cloths. No particular limitation is imposed on the base material. In the case of the thermoplastic films, may be used transparent films such as films of polyester, polystyrene, polyvinyl chloride, polymethyl methacrylate, cellulose acetate, polyethylene and polycarbonate, as well as opaque sheets opacified by the filling of an alumina hydrate or the formation of minute foams.

A dispersion of the alumina hydrate, which is suitably used in the production of the recording medium according to the present invention, can be prepared in the following manner. The above-described powdery alumina hydrate is added to deionized water to prepare a dispersion containing solids at a desired concentration. Mechanical shear force or ultrasonic energy is applied to the dispersion, as needed, to control the particle size of the alumina hydrate. Thereafter, a binder dispersion separately prepared is added to the former dispersion. The resulting mixture is subjected to dispersion, heating, defoaming and/or the like as needed, thereby obtaining a final dispersion for coating.

In the recording media having an ink-receiving layer according to the present invention, as a process for forming the ink-receiving layer on the base material, may be used a process in which the dispersion containing the alumina hydrate and the like is applied to the base material by means of a coater, and then dried. As a coating process, may be used a generally-used coating technique making use of a blade coater, air knife coater, roll coater, brush coater, curtain coater, bar coater, gravure coater or sprayer. The coating weight of the dispersion is within a range of from 0.5 to 60 $g/m^2$, more preferably from 5 to 45 $g/m^2$ in dried state. As needed, the resulting recording medium may by subjected to supercalendering or the like so as to improve the smoothness of the ink-receiving layer.

The recording media of another type according to the present invention, in which the alumina hydrate is internally contained in the base material, can be produced using an internally-adding process in which the alumina hydrate (its dispersion) is added to a slurry containing a fibrous material in a paper making process. In such an internally-adding process, a paper-strength improving agent, retention aid and colorant may be added for use as needed. The retention aid may be selected from cationic retention aids such as cationic starch and dicyanediamide-formalin condensates, and anionic retention aids such as anionic polyacrylamide and anionic colloidal silica. These may also be used in combination with each other.

Inks used in conducting recording on the recording media according to the present invention comprises principally a coloring material (dye or pigment), a water-soluble organic solvent and water. Preferred examples of the coloring material include water-soluble dyes represented by direct dyes, acid dyes, basic dyes, reactive dyes and food colors. However, any coloring materials may be used so far as they provide images satisfying required performance such as fixing ability, coloring ability, brightness, stability, light fastness and the like in combination with the above-described recording media.

The water-soluble dyes are generally used by dissolving them in water or a solvent composed of water and at least one organic solvent. As a preferable solvent component for these dyes, may be used a mixed solvent composed of water and at least one of various water-soluble organic solvents. It is however preferable to control the content of water in an ink within a range of from 20 to 90% by weight, more preferably from 60 to 90% by weight.

Examples of the water-soluble organic solvents include alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones and keto alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, hexylene glycol and diethylene glycol; thiodiglycol; 1,2,6-hexanetriol; glycerol; lower alkyl ethers of polyhydric alcohols, such as ethylene glycol methyl ether, diethylene glycol methyl ether, diethylene glycol ethyl ether, triethylene glycol monomethyl ether and triethylene glycol monoethyl ether; and the like. Among these many water-soluble organic solvents, the polyhydric alcohols such as diethylene glycol, and the lower alkyl ethers of polyhydric alcohol, such as triethylene glycol monomethyl ether and triethylene glycol monoethyl ether are preferred. The polyhydric alcohols are particularly preferred because they have an effect as a lubricant for inhibiting the clogging of nozzles, which is caused by the evaporation of water in an ink and hence the deposition of a water-soluble dye.

A solubilizer may be added to the inks. Nitrogen-containing heterocyclic ketones are typical solubilizers. Its object is to enhance the solubility of the water-soluble dye in the solvent by leaps and bounds. For example, N-methyl-2-pyrrolidone, 1,3-dimethyl-2-imidazolidinone are preferably used. In order to further improve the properties of inks, may be added additives such as viscosity modifiers, surfactants, surface tension modifiers, pH adjustors and specific resistance adjustors.

A preferred method of conducting recording by applying the above-described ink to the recording medium is an ink-jet recording method. As such a method, any systems may be used so far as they can effectively eject an ink out of a nozzle to apply it to the recording medium. In particular, an ink-jet recording system described in Japanese Patent Application Laid-Open No. 54-59936, in which an ink undergoes a rapid volumetric change by an action of thermal energy applied to the ink, so that the ink is ejected out of a nozzle by the working force generated by this change of state, may be used effectively.

EXAMPLES

The present invention will hereinafter be described more specifically by the following Examples. However, the present invention is not limited to these examples. The measurements of various properties according to this invention were conducted with the following points in mind:

1) BET specific surface area, pore radius distribution, pore volume and isothermal adsorption and desorption curve:

After an alumina hydrate sample or a recording medium sample in which an ink-receiving layer had been formed on a PET film was thoroughly heated and deaerated, measurement was conducted using the nitrogen adsorption and desorption method (Autosorb 1, manufactured by Quanthachrome Co.).

i) The BET specific surface area was calculated in accordance with the method of Brunauer, et al. [J. Am. Chem. Soc., Vol. 60, 309 (1938)].

ii) The pore radius and pore volume were calculated in accordance with the method of Barrett, et al. [J. Am. Chem. Soc., Vol. 73, 373 (1951)].

iii) The relative pressure difference (ΔP) between adsorption and desorption at 90 percent of the maximum amount of adsorbed gas was found from an isothermal nitrogen adsorption and desorption curve.

2) X-ray diffraction pattern:

An X-ray diffractometer (manufactured by RIGAKU CORPORATION) was used.

3) Shape observation of alumina hydrate (aspect ratio and slenderness ratio):

An alumina hydrate sample was dispersed in deionized water, and the resultant dispersion was dropped on a collodion membrane to prepare a sample for measurement. This sample was observed through a transmission type electron microscope (H-500, manufactured by Hitachi Ltd.).

4) Number of hydroxyl groups:

One gram of an alumina hydrate sample was weighed out to titrate it with triethylaluminum.

5) Zeta-potential:

An alumina hydrate sample was dispersed in deionized water to give a solids concentration of 0.1% by weight, and the dispersion was then adjusted to pH 6 with a nitric acid, thereby conducting measurement. (Bi-ZETA plus, manufactured by Brookheaven Co., dispersion temperature: 20° C., an acrylic cell was used.)

6) Solution viscosity:

An aqueous dispersion sample at solids concentration of 15% by weight, 20% by weight or 25% by weight was prepared to measure its viscosity at 20° C. and a shear rate of 7.9 sec$^{-1}$ (in the case of the solids concentration of 15% by weight) or 10.9 sec$^{-1}$ (in the case of the solids concentration of 20% by weight or 25% by weight) by means of a VISCOMETER manufactured by TOKIMEC Co.

7) Nitrate anion:

A nitrate anion was extracted from an alumina hydrate sample with hot water to measure its quantity by an ion-exchange chromatograph (L-3720, manufactured by Hitachi Ltd.), thereby determining the quantity of the nitrate anion in terms of % by weight of dried alumina hydrate.

8) Quantitative analysis of titanium dioxide:

The content of titanium dioxide in the whole alumina hydrate sample was determined by fusing the alumina hydrate sample in a borate in accordance with the ICP method (SPS 4000, manufactured by Seiko-Electronic Inc.). The distribution of titanium dioxide in the alumina hydrate sample was analyzed by means of an ESCA (Model 2803, manufactured by Surface Science Instruments Co.). The surface of the alumina hydrate sample was etched with an argon ion for 100 seconds and 500 seconds to determine the change in content of the titanium dioxide. Etching conditions was as follows:

Argon pressure: 5×10$^{-4}$ Pa:
Voltage applied: 3 kV
Current (d.c.) applied: 3 mA.
[First Aspect]

Examples 1 to 4

Figure 5:
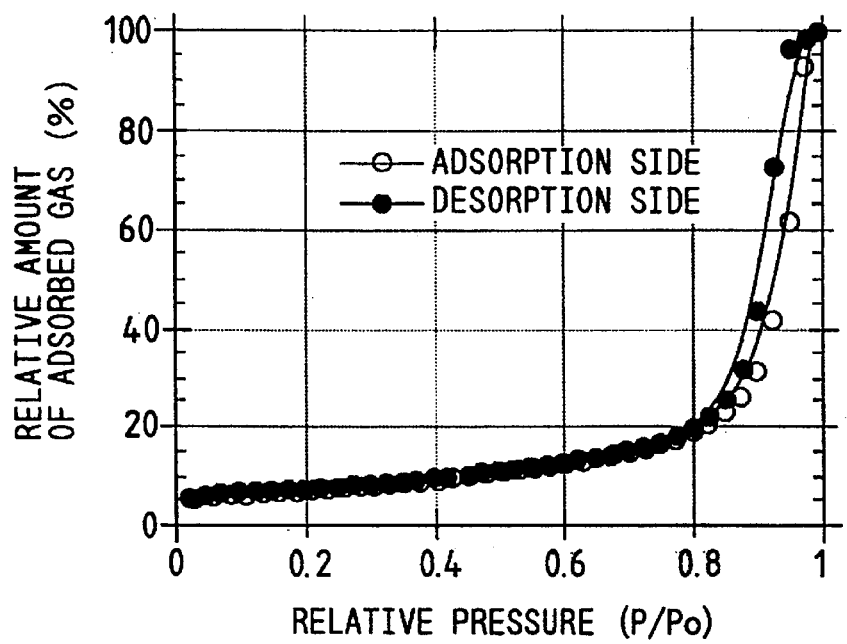
FIG. 5 diagrammatically illustrates an isothermal adsorption curve of an alumina hydrate used in the first aspect of the present invention.

Aluminum dodeoxide was prepared in accordance with the process described in U.S. Pat. No. 4,242,271. The aluminum dodeoxide was then hydrolyzed in accordance with the process described in U.S. Pat. No. 4,202,870 to prepare an alumina slurry. Water was added to the alumina slurry until the solid content of alumina hydrate was 7.9%. The pH of the alumina slurry was 9.5. A 3.9% nitric acid solution was added to adjust the pH of the slurry. Colloidal sols were obtained under their corresponding aging conditions shown in Table 1. Each of these colloidal sols was spray-dried at 75° C. to obtain its corresponding alumina hydrate. This alumina hydrate was non-crystal as shown by an X-ray diffraction pattern in FIG. 2. As illustrated by a photograph (an electron microphotograph: 60,000 magnifications) in FIG. 3, it was also in the form of a flat plate. The physical property values of the resulting alumina hydrates were measured in accordance with the respective methods described above. The results are shown in Table 2 and FIGS. 5 and 6.

Polyvinyl alcohol (Gohsenol NH18, product of The Nippon Synthetic Chemical Industry Co., Ltd.) was dissolved or dispersed in deionized water to obtain a 10% by weight solution or dispersion. The four different kinds of alumina hydrates obtained above were separately similarly dispersed in deionized water to obtain 15% by weight dispersions. Each of the alumina hydrate dispersions and the polyvinyl alcohol solution were weighed out to give a weight ratio of 10:1 in terms of solids and mixed with each other. The resultant mixture was stirred to obtain a mixed dispersion. The mixed dispersion was applied by a die coating process to one side of a PET film (Lumiror, product of Toray Industries, Inc.) having a thickness of 100 μm to form an ink-receiving layers having a thickness of 30 μm. FIG. 4 is a photograph (an electron microphotograph: 50,000 magnifications) illustrating the section of the ink-receiving layer and indicates that the alumina hydrate in the form of a flat plate lies at random in the ink-receiving layer. The physical property values of the ink-receiving layer were measured in accordance with the respective methods described above. The results are shown in Table 3. Printing was conducted on the thus-obtained recording media to evaluate their printability in accordance with the following standards. The evaluation results are also shown in Table 3.

Printability:

Using an ink-jet printer equipped with four recording heads for yellow, magenta, cyan and black inks, each of said heads having 128 nozzles in a proportion of 16 nozzles per mm, ink-jet recording was conducted with inks of the following compositions, thereby evaluating the recording media in ink-drying ability (absorptiveness), optical density of an image, bleeding and beading.

(1) Ink-drying ability:

After single-color or multi-color solid printing was conducted with the yellow, magenta, cyan and black inks of the following ink composition 1, the recorded area of each recording medium was touched with a finger to determine the drying condition of the inks on the surface of the recording medium. The quantity of ink in the single-color printing was determined as 100%. The ink-drying ability was ranked as A where none of the inks adhered to the finger in an ink quantity of 200%, B where none of the inks adhered to the finger in an ink quantity of 100%, or C where any ink adhered to the finger in an ink quantity of 100%.

(2) Optical density:

Solid printing was conducted separately with the yellow, magenta, cyan and black inks of the following ink composition 1. The optical density of each of the images formed was determined by means of a Macbeth reflection densitometer RD-918.

(3) Bleeding and beading:

After single-color or multi-color solid printing was conducted with the yellow, magenta, cyan and black inks of the following ink composition 1, the recording media were evaluated by whether bleeding occurred on their surfaces. Besides, single-color or multi-color solid printing was conducted with the respective yellow, magenta, cyan and black inks of the following two ink compositions to visually evaluate the recording media by whether beading occurred. The quantity of ink in the single-color printing was determined as 100%. The resistance to bleeding or the resistance to beading of the recording media was ranked as A where bleeding or beading did not occur in an ink quantity of 200%, B where bleeding or beading did not occur in an ink quantity of 100%, or C where bleeding or beading occurred in an ink quantity of 100%.

Ink composition 1:

| Dye | 5 parts |
| Diethylene glycol | 10 parts |
| Polyethylene glycol | 10 parts |
| Water | 75 parts. |

Ink composition 2:

| Dye | 5 parts |
| Glycerol | 15 parts |
| Polyethylene glycol | 20 parts |
| Water | 70 parts. |

Dye in ink:
Yellow (Y): C.I. Direct Yellow 86
Magenta (M): C.I. Acid Red 35
Cyan (C): C.I. Direct Blue 199
Black (Bk): C.I. Food Black 2.

Examples 5 to 8

Each of the alumina hydrate dispersions prepared in Examples 1 to 4 and the polyvinyl alcohol dispersion as described in Examples 1 to 4 were weighed out to give a weight ratio of 15:1 in terms of solids and mixed with each other. The resultant mixture was stirred to obtain a mixed dispersion. The mixed dispersion was applied by an air knife coating process to one side of a wood free paper web (Shiraoi 157, product of Daishowa Paper Manufacturing Co., Ltd.) at a rate of 20 g/m$^2$ to form an ink-receiving layer. Printing was conducted on the thus-obtained recording media to evaluate their printability in accordance with the above-described standards. The evaluation results are shown in Table 4.

Examples 9 to 12

A paper web having a basis weight of 70 g/m$^2$ was made by means of a TAPPI standard sheet former by using, as raw pulp, 80 parts of bleached hardwood kraft pulp (LBKP) having a freeness (C.S.F.) of 370 ml and 20 parts of bleached softwood kraft pulp (NBKP) having a freeness of 410 ml, incorporating, as a filler, each of the alumina hydrates prepared in Examples 1 to 4 in a proportion of 35% by weight based on the solid content of the pulp and as a retention aid, cationic starch (CATOF, product of Oji National K.K.) in a proportion of 0.3% by weight based on the solid content of the pulp into the pulp, and then adding 0.05% by weight of a polyacrylamide retention aid (Pearlflock FR-X, product of Seiko Chemical Industries Co., Ltd.) right before paper making. A 2% solution of oxidized starch (MS3800, product of Nihon Shokuhin Kako Co., Ltd.) was then applied to the web by a size press to obtain a recording media. Printing was conducted on the thus-obtained recording media to evaluate their printability in accordance with the above-described standards. The evaluation results are shown in Table 5.

Comparative Example 1:

An alumina sol (AS-2, product of Catalyst & Chemical Industries Co., Ltd.) and polyvinyl alcohol (PVA 117, product of Kuraray Co., Ltd.) were applied to the same PET film as that used in Example 1 in accordance with the process described in Example 1 of Japanese Patent Application Laid-Open No. 4-4181 to prepare a recording medium. The zeta-potential of the alumina sol was measured in accordance with the method described above. Further, the alumina sol was concentrated to a solids concentration of 15% to measure its viscosity. The physical property values and evaluation results thereof are shown in Table 6.

Comparative Example 2:

A recording medium was prepared by using an alumina sol (AS-3, product of Catalyst & Chemical Industries Co., Ltd.) and the same polyvinyl alcohol as that used in Comparative Example 1 in accordance with the process described in Example 4 of Japanese Patent Application Laid-Open No. 4-4181. The physical property values and evaluation results thereof are shown in Table 6.

Comparative Example 3:

A recording medium was prepared by using an alumina sol (100, product of Nissan Chemical Industries, Ltd.) and the same polyvinyl alcohol as that used in Comparative Example 1 in accordance with the process described in Example 1 of Japanese Patent Application Laid-Open No. 3-143678. The physical property values and evaluation results thereof are shown in Table 6.

Comparative Example 4:

An alumina sol was prepared in accordance with the process described in Example 1 of Japanese Patent Application Laid-Open No. 5-32037. A recording medium was prepared by using this alumina sol and the same polyvinyl alcohol as that used in Comparative Example 1. The physical property values and evaluation results thereof are shown in Table 6.

TABLE 1

| Aging condition | Sample | | | |
| --- | --- | --- | --- | --- |
| | Ex. 1 | Ex. 2 | Ex. 3 | Ex. 4 |
| pH before aging | 5.6 | 6.9 | 6.0 | 5.8 |
| Aging temperature (°C.) | 110 | 150 | 180 | 120 |
| Aging period (hrs) | 8 | 4 | 3 | 5 |
| Aging apparatus | Autoclave | Autoclave | Autoclave | Autoclave |

TABLE 2

| Item determined | Sample | | | |
| --- | --- | --- | --- | --- |
| | Ex. 1 | Ex. 2 | Ex. 3 | Ex. 4 |
| Average particle size (nm) | 43 | 38 | 32 | 26 |
| Aspect ratio | 3.3 | 5.6 | 7.9 | 10.0 |
| Slenderness ratio | 0.7 | 0.7 | 0.7 | 0.7 |
| BET specific surface area (m$^2$/g) | 75 | 93 | 135 | 200 |
| Average pore radius (Å) | 125 | 85 | 50 | 30 |
| Half breadth (Å) | 100 | 80 | 50 | 20 |

TABLE 2-continued

| Item determined | Sample | | | |
|---|---|---|---|---|
| | Ex. 1 | Ex. 2 | Ex. 3 | Ex. 4 |
| Pore volume (cc/g) | 0.57 | 0.55 | 0.55 | 0.51 |
| Relative pressure difference ($\Delta P$) | 0.03 | 0.02 | 0.10 | 0.10 |
| Number of OH groups (groups/g) | $2.0 \times 10^{20}$ | $1.8 \times 10^{20}$ | $1.5 \times 10^{20}$ | $1.6 \times 10^{20}$ |
| Zeta-potential (mV) | 20 | 23 | 17 | 17 |
| Nitrate anion (% by weight) | 0.1 | 0.1 | 1.0 | 1.0 |
| Dispersion viscosity (cP) | | | | |
| 15% by weight | 20 | 20 | 17 | 17 |
| 20% by weight | 77 | 59 | 49 | 61 |
| 25% by weight | 409 | 460 | 430 | 457 |

TABLE 3

| Item determined | Sample | | | |
|---|---|---|---|---|
| | Ex. 1 | Ex. 2 | Ex. 3 | Ex. 4 |
| Average pore radius (Å) | 125 | 80 | 40 | 30 |
| Half breadth (Å) | 140 | 100 | 60 | 40 |
| Pore volume | | | | |
| (cc/g) | 0.53 | 0.50 | 0.50 | 0.49 |
| (cc/m$^2$) | 9.0 | 8.6 | 8.4 | 8.2 |
| Relative pressure difference ($\Delta P$) | 0.03 | 0.07 | 0.02 | 0.10 |
| Printability: | | | | |
| Drying ability | A | A | A | A |
| Optical density: | | | | |
| Y | 1.58 | 1.55 | 1.53 | 1.53 |
| M | 1.47 | 1.50 | 1.48 | 1.52 |
| C | 1.60 | 1.57 | 1.61 | 1.55 |
| Bk | 1.64 | 1.61 | 1.59 | 1.57 |
| Bleeding | A | A | A | A |
| Beading | | | | |
| Ink composition 1 | A | A | A | A |
| Ink composition 2 | A | A | A | A |

TABLE 4

| Item determined | Sample | | | |
|---|---|---|---|---|
| | Ex. 5 | Ex. 6 | Ex. 7 | Ex. 8 |
| Printability: | | | | |
| Drying ability | A | A | A | A |
| Optical density: | | | | |
| Y | 1.42 | 1.42 | 1.44 | 1.43 |
| M | 1.43 | 1.47 | 1.46 | 1.45 |
| C | 1.47 | 1.45 | 1.46 | 1.49 |
| Bk | 1.48 | 1.47 | 1.45 | 1.46 |
| Bleeding | A | A | A | A |

TABLE 4-continued

| Item determined | Sample | | | |
|---|---|---|---|---|
| | Ex. 5 | Ex. 6 | Ex. 7 | Ex. 8 |
| Beading | | | | |
| Ink composition 1 | A | A | A | A |
| Ink composition 2 | A | A | A | A |

TABLE 5

| Item determined | Sample | | | |
|---|---|---|---|---|
| | Ex. 9 | Ex. 10 | Ex. 11 | Ex. 12 |
| Printability: | | | | |
| Drying ability | A | A | A | A |
| Optical density: | | | | |
| Y | 1.02 | 1.02 | 1.04 | 1.03 |
| M | 1.03 | 1.07 | 1.06 | 1.05 |
| C | 1.07 | 1.05 | 1.06 | 1.09 |
| Bk | 1.08 | 1.07 | 1.05 | 1.06 |
| Bleeding | A | A | A | A |
| Beading | | | | |
| Ink composition 1 | A | A | A | A |
| Ink composition 2 | A | A | A | A |

TABLE 6

| Item determined | Sample | | | |
|---|---|---|---|---|
| | Comp. Ex. 1 | Comp. Ex. 2 | Comp. Ex. 3 | Comp. Ex. 4 |
| Zeta-potential (mV) | 10 | 7 | 9 | 10 |
| Dispersion viscosity (cP) | 200 | 250 | 180 | 230 |
| Average pore radius (Å) | 20 | 33 | 20 | 60 |
| Peak 1 of pore distribution (Å) | 20 | 30 | 22 | 60 |
| Peak 2 of pore distribution (Å) | — | — | — | — |
| Half breadth (Å) | 10 | 14 | 12 | 15 |
| Pore volume | | | | |
| (cc/g) | 0.83 | 0.50 | 0.06 | 0.66 |
| (cc/m$^2$) | 1.0 | 0.8 | 0.01 | 2.0 |
| Relative pressure difference ($\Delta P$) | 0.25 | 0.25 | 0.23 | 0.23 |
| Printability: | | | | |
| Drying ability | C | C | C | C |
| Optical density: | | | | |
| Y | 1.68 | 1.67 | 1.66 | 1.69 |
| M | 1.51 | 1.54 | 1.53 | 1.50 |
| C | 1.50 | 1.52 | 1.51 | 1.53 |
| Bk | 1.46 | 1.48 | 1.47 | 1.46 |
| Bleeding | B | B | B | A |
| Beading | | | | |
| Ink composition 1 | B | B | B | A |
| Ink composition 2 | C | B | C | B |

[Second Aspect]

Examples 13 to 16

Alumina hydrates were obtained in the same manner as in Examples 1 to 4 except that the aging conditions in Examples 1 to 4 were changed to aging conditions shown in Table 7.

Figure 2:
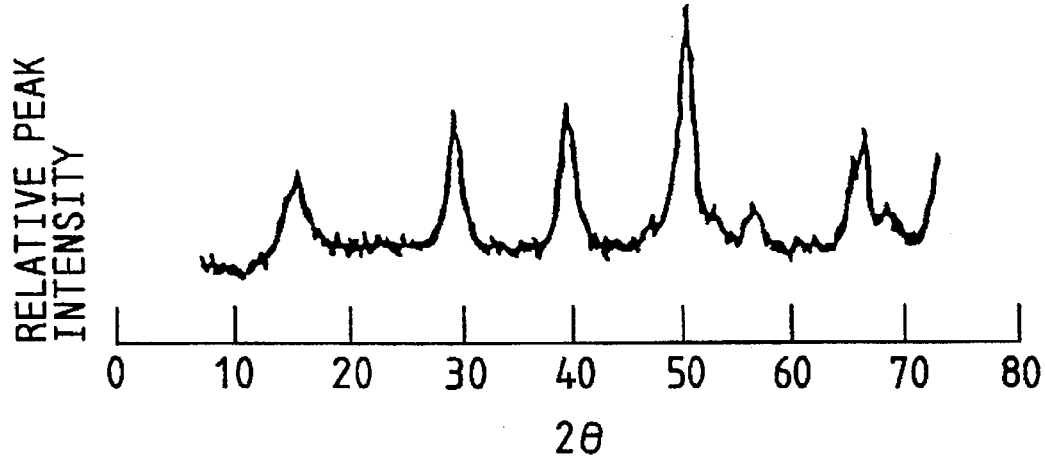
FIG. 2 diagrammatically illustrates an X-ray diffraction pattern of an alumina hydrate according to the present invention.
Figure 7:
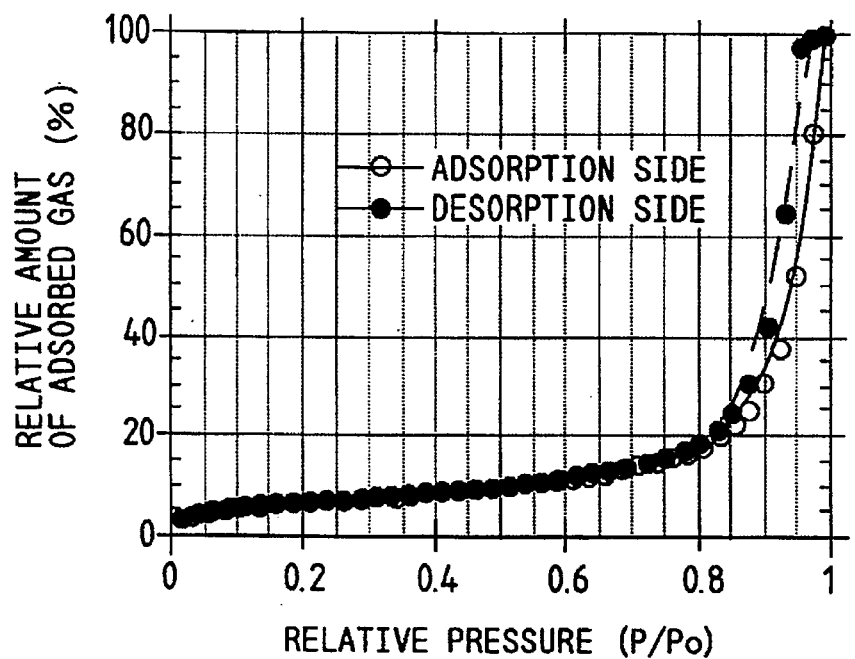
FIG. 7 diagrammatically illustrates an isothermal adsorption curve of an alumina hydrate used in the second aspect of the present invention.
Figure 8:
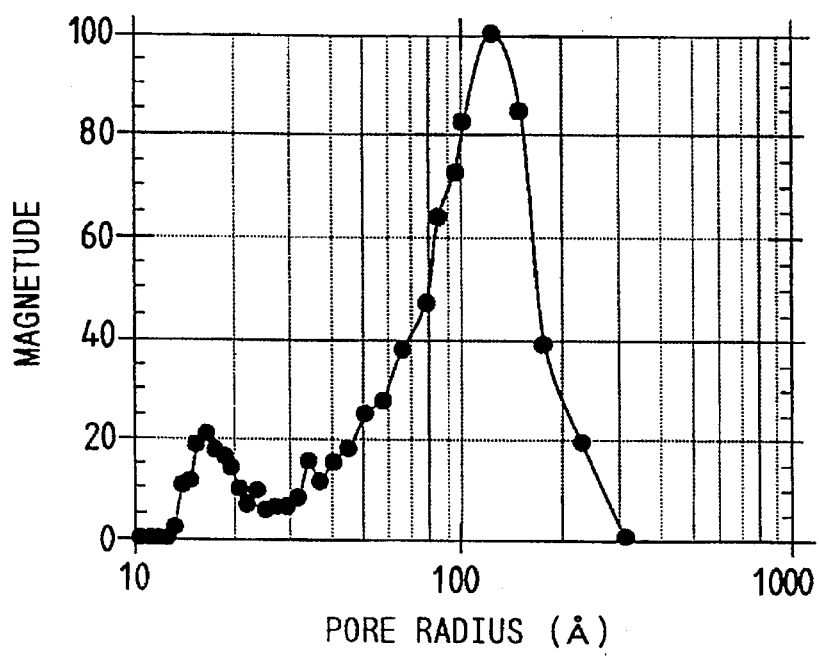
FIG. 8 diagrammatically illustrates the pore radius distribution of the alumina hydrate used in the second aspect of the present invention.

These alumina hydrates showed an X-ray diffraction pattern similar to that illustrated in FIG. 2 and were hence amorphous. A photograph similar to the photograph (an electron microphotograph: 60,000 magnifications) in FIG. 3 was taken, and it was hence confirmed that they were in the form of a flat plate. The physical property values of the alumina hydrates were measured in accordance with the respective methods described above. The results are shown in Table 8 and FIGS. 7 and 8.

TABLE 7

| Aging condition | Sample | | | |
|---|---|---|---|---|
| | Ex. 13 | Ex. 14 | Ex. 15 | Ex. 16 |
| pH before aging | 6.6 | 6.9 | 7.0 | 6.8 |
| Aging temperature (°C.) | 30 | 45 | 50 | 50 |
| Aging period | 2 weeks | 12 days | 8 days | 5 days |
| Aging apparatus | Oven | Oven | Oven | Autoclave |

Recording media comprising a PET film and an ink-receiving layer provided on the PET film were obtained in the same manner as in Examples 1 to 4 except that these alumina hydrates were respectively used.

The physical property values of the ink-receiving layers of these recording media and the evaluation results as to the printability of these recording media are shown in Table 9.

The evaluation of the printability was conducted in accordance with the following standards.

Printability:

Using an ink-jet printer equipped with four recording heads for yellow, magenta, cyan and black inks, each of said heads having 128 nozzles in a proportion of 16 nozzles per mm, ink-jet recording was conducted with the inks of the ink composition 1 described in Examples 1 to 4, thereby evaluating the recording media in ink-drying ability (absorptiveness), optical density of an image, bleeding and beading.

(1) Ink-drying ability:

After single-color or multi-color solid printing was conducted with the yellow, magenta, cyan and black inks, the recorded area of each recording medium was touched with a finger to determine the drying condition of the inks on the surface of the recording medium. The quantity of ink in the single-color printing was determined as 100%. The ink-drying ability was ranked as AA where none of the inks adhered to the finger in an ink quantity of 300%, A where none of the inks adhered to the finger in an ink quantity of 200%, B where none of the inks adhered to the finger in an ink quantity of 100%, or C where any ink adhered to the finger in an ink quantity of 100%.

(2) Optical density:

Solid printing was conducted with the black ink. The optical density of the image formed was determined by means of a Macbeth reflection densitometer RD-918.

(3) Bleeding and beading:

After single-color or multi-color solid printing was conducted with the yellow, magenta, cyan and black inks, the recording media were visually evaluated by whether bleeding or beading occurred on their surfaces. The quantity of ink in the single-color printing was determined as 100%. The resistance to bleeding or the resistance to beading of the recording media was ranked as AA where bleeding or beading did not occur in an ink quantity of 300%, A where bleeding or beading did not occur in an ink quantity of 200%, B where bleeding or beading did not occur in an ink quantity of 100%, or C where bleeding or beading occurred in an ink quantity of 100%.

TABLE 8

| Item determined | Sample | | | |
|---|---|---|---|---|
| | Ex. 13 | Ex. 14 | Ex. 15 | Ex. 16 |
| Average particle size (nm) | 40 | 35 | 31 | 28 |
| Aspect ratio | 3.8 | 5.8 | 7.6 | 9.8 |
| Slenderness ratio | 0.7 | 0.7 | 0.7 | 0.7 |
| BET specific surface area ($m^2/g$) | 80 | 95 | 130 | 190 |
| Peak 1 of pore distribution (Å) | 125 | 110 | 140 | 120 |
| Peak 2 of pore distribution (Å) | 17 | 30 | 50 | 60 |
| Pore volume (cc/g) | 0.57 | 0.55 | 0.55 | 0.51 |
| Volume ratio of peak 2 (%) | 5 | 8 | 10 | 10 |
| Relative pressure difference ($\Delta P$) | 0.03 | 0.02 | 0.10 | 0.10 |
| Number of OH groups (groups/g) | $1.9 \times 10^{20}$ | $1.5 \times 10^{20}$ | $1.7 \times 10^{20}$ | $2.0 \times 10^{20}$ |
| Zeta-potential (mV) | 20 | 23 | 17 | 17 |
| Nitrate anion (% by weight) | 0.1 | 0.5 | 0.7 | 1.0 |
| Dispersion viscosity (cP) | | | | |
| 15% by weight | 18 | 18 | 17 | 16 |
| 20% by weight | 43 | 50 | 80 | 75 |
| 25% by weight | 415 | 430 | 480 | 467 |

TABLE 9

| Item determined | Sample | | | |
|---|---|---|---|---|
| | Ex. 13 | Ex. 14 | Ex. 15 | Ex. 16 |
| Peak 1 of pore distribution (Å) | 125 | 110 | 125 | 130 |
| Peak 2 of pore distribution (Å) | 25 | 30 | 40 | 60 |
| Pore volume | | | | |
| (cc/g) | 0.53 | 0.50 | 0.50 | 0.49 |
| (cc/$m^2$) | 9.0 | 8.6 | 8.4 | 8.2 |
| Relative pressure difference ($\Delta P$) | 0.03 | 0.07 | 0.02 | 0.10 |
| Volume ratio of peak 2 (%) | 5 | 8 | 10 | 10 |
| Printability: | | | | |
| Drying ability | AA | AA | AA | AA |
| Optical density | 1.65 | 1.67 | 1.66 | 1.67 |
| Bleeding | AA | AA | AA | AA |
| Beading | AA | AA | AA | AA |

Examples 17 to 20

Each of the alumina hydrate dispersions prepared in Examples 13 to 16 and the polyvinyl alcohol dispersion as described in Examples 1 to 4 were weighed out to give a weight ratio of 15:1 in terms of solids and mixed with each other. The resultant mixture was stirred to obtain a mixed dispersion. The mixed dispersion was applied by an air knife coating process to one side of a wood free paper web (Shiraoi 157, product of Daishowa Paper Manufacturing Co., Ltd.) at a rate of 20 g/m² to form an ink-receiving layer. Printing was conducted on the thus-obtained recording media to evaluate their printability in accordance with the above-described standards. The evaluation results are shown in Table 10.

TABLE 10

| Item determined | Sample | | | |
|---|---|---|---|---|
| | Ex. 17 | Ex. 18 | Ex. 19 | Ex. 20 |
| Printability: | | | | |
| Drying ability | AA | AA | AA | AA |
| Optical density | 1.51 | 1.52 | 1.51 | 1.52 |
| Bleeding | AA | AA | AA | AA |
| Beading | AA | AA | AA | AA |

Examples 21 to 24

Recording media were obtained in the same manner as in Examples 9 to 12 except that the alumina hydrates prepared in Examples 13 to 16 were respectively used. Printing was conducted on the thus-obtained recording media to evaluate their printability in accordance with the above-described standards. The evaluation results are shown in Table 11.

TABLE 11

| Item determined | Sample | | | |
|---|---|---|---|---|
| | Ex. 21 | Ex. 22 | Ex. 23 | Ex. 24 |
| Printability: | | | | |
| Drying ability | AA | AA | AA | AA |
| Optical density | 1.08 | 1.09 | 1.08 | 1.09 |
| Bleeding | AA | AA | AA | AA |
| Beading | AA | AA | AA | AA |

[Third Aspect]

Examples 25 and 26

Figure 10:
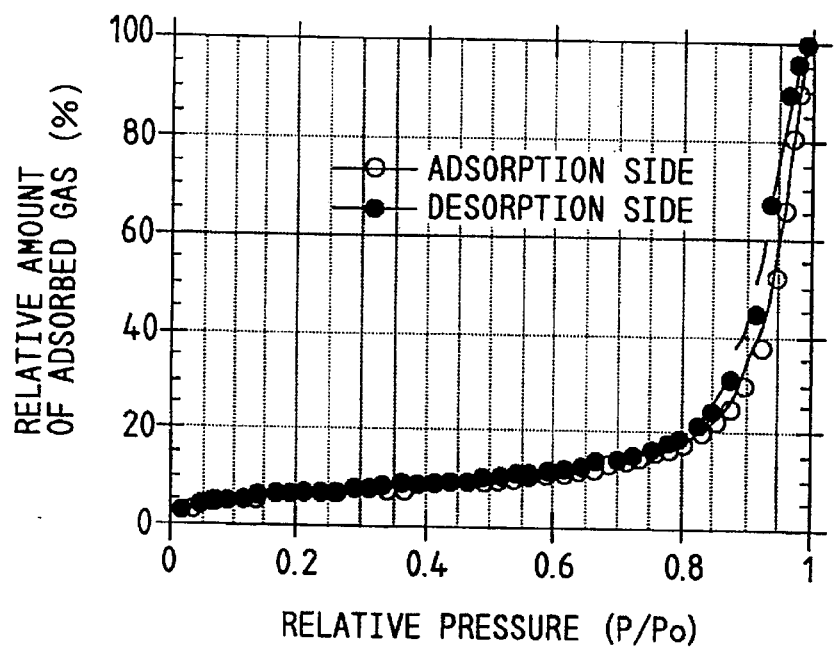
FIG. 10 diagrammatically illustrates an isothermal adsorption curve of a titanium dioxide-containing alumina hydrate used in the third aspect of the present invention.
Figure 11:
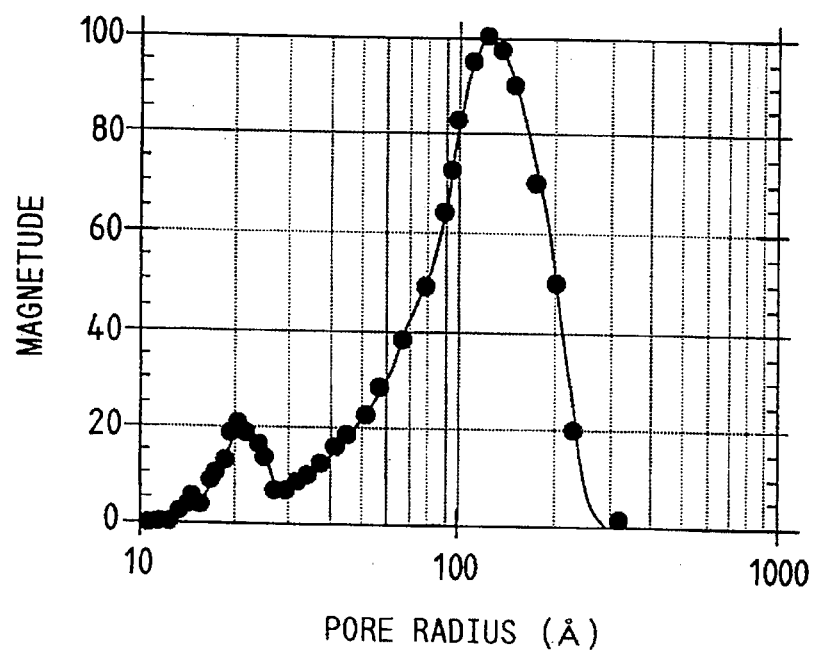
FIG. 11 diagrammatically illustrates the pore radius distribution of the titanium dioxide-containing alumina hydrate used in the third aspect of the present invention.

Aluminum dodeoxide was prepared in accordance with the process described in U.S. Pat. No. 4,242,271. Isopropyltitanium (product of Kishida Chemical Co., Ltd.) was then mixed in an amount 5/1000 times of the weight of the aluminum dodeoxide. The resulting aluminum dodeoxide mixture was hydrolyzed in accordance with the process described in U.S. Pat. No. 4,202,870 to prepare a titanium dioxide-containing alumina slurry. Water was added to the alumina slurry until the solid content of alumina hydrate was 7.9%. The pH of the alumina slurry was 9.5. A 3.9% nitric acid solution was added to adjust the pH of the slurry. Colloidal sols were obtained under their corresponding aging conditions shown in Table 13. Each of these colloidal sols was spray-dried to obtain its corresponding alumina hydrate. This alumina hydrate showed an X-ray diffraction pattern similar to that illustrated in FIG. 2 and was hence non-crystal. A photograph similar to the photograph (an electron microphotograph: 60,000 magnifications) in FIG. 3 was taken, and it was hence confirmed that its form was a flat plate form. The surface of the alumina hydrate was observed through an FE-TEM (HF 2000, manufactured by Hitachi Ltd.) of 500,000 magnifications. As a result, no titanium dioxide was observed. The physical property values of the alumina hydrates were measured in accordance with the respective methods described above. The results are shown in Table 14 and FIGS. 10 and 11.

On the other hand, the observation by ESCA revealed that the valence of titanium is +4 from the value of bound energy. Since no splitting occurred on 3 p peak for titanium and 2 p peak for aluminum, there was no interaction between titanium and aluminum. Namely, titanium dioxide solely existed without interacting between titanium and aluminum. When the surface of the titanium dioxide-containing alumina hydrate was etched, the amount of titanium was decreased to half in the etching time of 100 seconds. No titanium was detected in the etching time of 500 seconds. Therefore, it was confirmed that the titanium dioxide exists only in the vicinity of the surface of the alumina hydrate.

Recording media were obtained in the same manner as in Examples 1 to 4 except that the titanium dioxide-containing alumina hydrates were respectively used. The physical property values of their ink-receiving layers and evaluation results of the recording media are shown in Table 15. The evaluation was conducted in accordance with the following standards:

Printability:

Using an ink-jet printer equipped with four recording heads for yellow, magenta, cyan and black inks, each of said heads having 128 nozzles in a proportion of 16 nozzles per mm, ink-jet recording was conducted with the inks of the ink composition 1 described in Examples 1 to 4, thereby evaluating the recording media in ink-drying ability (absorptiveness), optical density of an image, bleeding and beading.

(1) Ink-drying ability:

After single-color or multi-color solid printing was conducted with the yellow, magenta, cyan and black inks, the recorded area of each recording medium was touched with a finger to determine the drying condition of the inks on the surface of the recording medium. The quantity of ink in the single-color printing was determined as 100%. The ink-drying ability was ranked as A where none of the inks adhered to the finger in an ink quantity of 200%, B where none of the inks adhered to the finger in an ink quantity of 100%, or C where any ink adhered to the finger in an ink quantity of 100%.

(2) Optical density:

Solid printing was conducted with the black ink. The optical density of the image formed was determined by means of a Macbeth reflection densitometer RD-918.

(3) Bleeding and beading:

After single-color or multi-color solid printing was conducted with the yellow, magenta, cyan and black inks, the recording media were visually evaluated by whether bleeding or beading occurred on their surfaces. The quantity of ink in the single-color printing was determined as 100%. The resistance to bleeding or the resistance to beading of the recording media was ranked as A where bleeding or beading did not occur in an ink quantity of 200%, B where bleeding or beading did not occur in an ink quantity of 100%, or C where bleeding or beading occurred in an ink quantity of 100%.

Examples 27 and 28

Aluminum dodeoxide was prepared in the same manner as in Examples 25 and 26. The aluminum dodeoxide was hydrolyzed in the same manner as in Examples 25 and 26 to prepare an alumina slurry. The aluminum dodeoxide and isopropyltitanium (product of Kishida Chemical Co., Ltd.) were mixed at a mixing ratio of 100:5 by weight. Using the alumina slurry as a nucleus for crystal growth, the mixture was hydrolyzed in the same manner as in Examples 25 and 26 to prepare a titanium dioxide-containing alumina hydrate slurry. Water was added to the alumina slurry until the solid content of alumina hydrate was 7.9%. The pH of the alumina slurry was 9.5. A 3.9% nitric acid solution was added to adjust the pH of the slurry. Colloidal sols were obtained under their corresponding aging conditions shown in Table 13. Each of these colloidal sols was spray-dried at 75° C. to obtain its corresponding alumina hydrate. As with those obtained in Examples 25 and 26, the alumina hydrate was non-crystal and was in the form of a flat plate. The physical property values of the alumina hydrates were measured in accordance with the respective methods described above. The results are shown in Table 14. As with those obtained in Examples 25 and 26, the titanium dioxide existed only in the vicinity of the surface of the alumina hydrate.

Recording media were obtained in the same manner as in Examples 1 to 4 except that the titanium dioxide-containing alumina hydrates were respectively used. The physical property values of their ink-receiving layers and evaluation results of the recording media are shown in Table 15. The evaluation was conducted in accordance with the same methods as those used in Examples 25 and 26.

TABLE 13

| Aging condition | Sample | | | |
|---|---|---|---|---|
| | Ex. 25 | Ex. 26 | Ex. 27 | Ex. 28 |
| pH before aging | 5.6 | 6.9 | 6.9 | 7.3 |
| Aging temperature (°C.) | 110 | 150 | 40 | 50 |
| Aging period | 8 hours | 4 hours | 4 weeks | 3 weeks |
| Aging apparatus | Auto-clave | Auto-clave | Oven | Oven |

TABLE 14

| Item determined | Sample | | | |
|---|---|---|---|---|
| | Ex. 25 | Ex. 26 | Ex. 27 | Ex. 28 |
| Titanium dioxide content (ICP, % by weight) | 0.150 | 0.140 | 0.150 | 0.140 |
| Bound energy (eV) | 459 | 459 | 459 | 459 |
| Titanium dioxide content (ESCA, % by atom number) | 0.02 | 0.02 | 0.02 | 0.02 |
| Titanium dioxide content after etching of the surface | | | | |
| 100 seconds | 0.01 | 0.01 | 0.01 | 0.01 |
| 500 seconds | 0.00 | 0.00 | 0.00 | 0.00 |
| Average particle size (nm) | 45.0 | 35.0 | 40.0 | 30.0 |
| Aspect ratio | 3.5 | 8.3 | 3.5 | 8.1 |

TABLE 14-continued

| Item determined | Sample | | | |
|---|---|---|---|---|
| | Ex. 25 | Ex. 26 | Ex. 27 | Ex. 28 |
| Slenderness ratio | 0.7 | 0.7 | 0.7 | 0.7 |
| BET specific surface area ($m^2/g$) | 76 | 134 | 70 | 140 |
| Average pore radius (Å) | 130 | 80 | 70 | 60 |
| Half breadth (Å) | 100 | 60 | 20 | 20 |
| Peak 1 of pore distribution (Å) | 130 | 80 | 120 | 140 |
| Peak 2 of pore distribution (Å) | — | — | 40 | 50 |
| Pore volume (cc/g) | 0.57 | 0.55 | 0.57 | 0.55 |
| Volume ratio of peak 2 (%) | — | — | 5 | 10 |
| Relative pressure difference ($\Delta P$) | 0.03 | 0.10 | 0.03 | 0.10 |
| Number of OH groups (groups/g) | $1.6 \times 10^{20}$ | $1.7 \times 10^{20}$ | $1.9 \times 10^{20}$ | $1.5 \times 10^{20}$ |
| Zeta-potential (mV) | 20 | 17 | 20 | 17 |
| Nitrate anion (% by weight) | 0.1 | 0.5 | 0.1 | 0.5 |
| Dispersion viscosity (cP) | | | | |
| 15% by weight | 17 | 15 | 18 | 13 |
| 20% by weight | 40 | 70 | 53 | 83 |
| 25% by weight | 420 | 458 | 445 | 460 |

TABLE 15

| Item determined | Sample | | | |
|---|---|---|---|---|
| | Ex. 25 | Ex. 26 | Ex. 27 | Ex. 28 |
| Average pore radius (Å) | 125 | 90 | 75 | 65 |
| Half breadth (Å) | 95 | 50 | 20 | 20 |
| Peak 1 of pore distribution (Å) | 130 | 80 | 140 | 150 |
| Peak 2 of pore distribution (Å) | — | — | 50 | 70 |
| Volume ratio of peak 2 (%) | — | — | 5 | 10 |
| Pore volume | | | | |
| (cc/g) | 0.53 | 0.50 | 0.53 | 0.50 |
| ($cc/m^2$) | 9.0 | 8.4 | 9.0 | 8.4 |
| Relative pressure difference ($\Delta P$) | 0.03 | 0.02 | 0.03 | 0.02 |
| Printability: | | | | |
| Drying ability | A | A | A | A |
| Optical density | 1.71 | 1.72 | 1.71 | 1.70 |
| Bleeding | A | A | A | A |
| Beading | A | A | A | A |

Examples 29 to 32

Each of the alumina hydrate dispersions prepared in Examples 25 to 28 and the polyvinyl alcohol dispersion as described in Example 25 were weighed out to give a weight ratio of 15:1 in terms of solids and mixed with each other. The resultant mixture was stirred to obtain a mixed dispersion. The mixed dispersion was applied by an air knife coating process to one side of a wood free paper web (Shiraoi 157, product of Daishowa Paper Manufacturing Co., Ltd.) at a rate of 20 g/m² to form an ink-receiving layer. The evaluation results of the recording media are shown in Table 16. The evaluation was conducted in accordance with the same methods as those used in Examples 25 to 28.

TABLE 16

| Item determined | Sample | | | |
|---|---|---|---|---|
| | Ex. 29 | Ex. 30 | Ex. 31 | Ex. 32 |
| Printability: | | | | |
| Drying ability | A | A | A | A |
| Optical density | 1.65 | 1.67 | 1.65 | 1.66 |
| Bleeding | A | A | A | A |
| Beading | A | A | A | A |

Examples 33 to 36

Recording media were obtained in the same manner as in Examples 9 to 12 except that the alumina hydrates prepared in Examples 25 to 28 were respectively used. Printing was conducted on the thus-obtained recording media to evaluate their printability in accordance with the above-described standards. The evaluation results are shown in Table 17.

TABLE 17

| Item determined | Sample | | | |
|---|---|---|---|---|
| | Ex. 33 | Ex. 34 | Ex. 35 | Ex. 36 |
| Printability: | | | | |
| Drying ability | A | A | A | A |
| Optical density | 1.08 | 1.07 | 1.08 | 1.09 |
| Bleeding | A | A | A | A |
| Beading | A | A | A | A |

The recording media according to the present invention and the ink-jet recording method making use of these recording media have the following advantageous effects.

In the first aspect:
1) Individual dyes and solvent components in inks were selectively adsorbed to pores having a specific radius. Therefore, when a medium having wide pore radius distribution is used, printability becomes hard to be affected by the composition of ink. Accordingly, selectivity to the composition of ink becomes higher.
2) Since the recording media have no hysteresis, the solvent component in an ink is easy to be desorbed. Therefore, the ink-drying ability of the media is improved, and so bleeding and setoff can be prevented.
3) When alumina in the form of a flat plate is used, the spaces among its particles can be widened if the closest packing is adopted. Therefore, there can be obtained a medium having pores considerably wide in pore radius distribution.
4) Since the alumina hydrate has good dispersibility, the viscosity of a dispersion can be kept low if the solids concentration of the dispersion is high.
5) Since the alumina hydrate has good dispersibility even at a neutral region near pH 7, the amount of an acid added to the dispersion can be decreased.

In the second aspect:
1) Since the individual pigments or ink-receiving layers have at least two peaks in pore radius distribution, the function of the pores can be divided.
2) Since a dye in an ink is effectively adsorbed to pores having a relatively small radius, images good in resolution and sufficient in optical density can be provided.
3) Since a solvent component in the ink can be quickly absorbed in pores having a relatively large radius, images free of beading, bleeding and running of the ink and good in resolution can be provided.
4) Since the recording media have no hysteresis, the solvent component in the ink is easy to be desorbed. Therefore, the ink-drying ability of the media is improved, and so bleeding and setoff can be prevented.
5) When alumina in the form of a flat plate is used, the spaces among its particles can be widened if the closest packing is adopted. Therefore, there can be obtained a medium having pores considerably wide in pore radius distribution.
6) Since the alumina hydrate has good dispersibility, the viscosity of a dispersion can be kept low if the solids concentration of the dispersion is high.
7) Since the alumina hydrate has good dispersibility even at a neutral region near pH 7, the amount of an acid added to the dispersion can be decreased.

In the third aspect:
1) Both dye-adsorbing ability and dispersibility can be improved by containing titanium dioxide in the alumina hydrate. Since the viscosity of the dispersion can be kept low even if the solids concentration of the dispersion is high, the coating thickness of the ink-receiving layer can be thickened. Further, since the adsorption and fixing of an ink upon printing can be improved, changes with time can be prevented.
2) When alumina in the form of a flat plate is used, the spaces among its particles can be widened if the closest packing is adopted. Therefore, there can be obtained a medium having pores considerably wide in pore radius distribution.
3) Since the alumina hydrate has good dispersibility, the viscosity of a dispersion can be kept low if the solids concentration of the dispersion is high.
4) Since the alumina hydrate has good dispersibility even at a neutral region near pH 7, the amount of an acid added to the dispersion can be decreased.
5) Since titanium dioxide is colorless, the ink-receiving layer is not colored even when it is added.
6) Individual dyes and solvent components in inks were selectively adsorbed to pores having a specific radius. Therefore, when a medium having wide pore radius distribution is used, printability becomes hard to be affected by the composition of ink. Accordingly, selectivity to the composition of ink becomes higher.
7) Since the individual titanium dioxide-containing alumina hydrates or ink-receiving layers have at least two peaks in pore radius distribution, the function of the pores can be divided. Since a dye in an ink is effectively adsorbed to pores having a relatively small radius, images good in resolution and sufficient in optical density can be provided. Since a solvent component in the ink can be quickly absorbed in pores having a relatively large radius, images free of beading, bleeding and running of the ink and good in resolution can be provided.

8) Since the recording media have no hysteresis, the solvent component in the ink is easy to be desorbed. Therefore, the ink-drying ability of the media is improved, and so bleeding and setoff can be prevented.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A recording medium comprising a base material and an ink-receiving layer which comprises a pigment and a binder and is provided on the base material, wherein the pigment is an alumina hydrate and the ink-receiving layer has an average pore radius of 20 to 200 Å and a half breadth of pore radius distribution of 20 to 150 Å.

2. The recording medium according to claim 1, wherein the pore volume of the alumina hydrate is within a range of from 0.4 to 0.6 cc/g.

3. The recording medium according to claim 1, wherein the pore volume of the ink-receiving layer is within a range of from 0.4 to 0.6 cc/g.

4. The recording medium according to claim 1, wherein the total pore volume of the ink-receiving layer is at least 8 cc/m$^2$.

5. The recording medium according to claim 1, wherein a relative pressure difference ($\Delta P$) between adsorption and desorption at 90 percent of the maximum amount of adsorbed gas as found from an isothermal nitrogen adsorption and desorption curve for the alumina hydrate is not larger than 0.2.

6. The recording medium according to claim 1, wherein a relative pressure difference ($\Delta P$) between adsorption and desorption at 90 percent of the maximum amount of adsorbed gas as found from an isothermal nitrogen adsorption and desorption curve for the ink-receiving layer is not larger than 0.2.

7. The recording medium according to claim 1, wherein the alumina hydrate is non-crystalline.

8. The recording medium according to claim 7, wherein the alumina hydrate is in the form of a flat plate having an average aspect ratio of 3 to 10.

9. The recording medium according to claim 8, wherein the alumina hydrate has a BET specific surface area of 70 to 300 m$^2$/g.

10. The recording medium according to claim 8, wherein the alumina hydrate has an average slenderness ratio of 0.6 to 1.0.

11. The recording medium according to claim 1, wherein the number of hydroxyl groups in the alumina hydrate is at least $10^{20}$ groups/g.

12. The recording medium according to claim 1, wherein the alumina hydrate has a zeta-potential of at least 15 mV at pH 6.

13. The recording medium according to claim 1, wherein the half breadth of pore radius distribution is in the range of from 80 to 150 Å.

14. The recording medium according to claim 1, wherein the binder comprises a water-soluble polymer.

15. The recording medium according to claim 14, wherein the water-soluble polymer is a material selected from the group consisting of polyvinyl alcohol, cationically-modified polyvinyl alcohol, anionically-modified polyvinyl alcohol, silanol-modified polyvinyl alcohol, starch, oxidized starch, etherified starch, casein, gum arabic, carboxymethyl cellulose, hydroxyethyl cellulose, hydroxypropyl cellulose, styrene-butadiene rubber, methylmethacrylate-butadiene copolymer, ethylene-vinyl acetate copolymer, polyvinyl pyrrolidone, maleic anhydride polymer or copolymers thereof, and acrylic ester copolymer.

16. The recording medium according to claim 1, wherein a mixing weight ratio of the alumina hydrate to the binder is in the range of from 1/1 to 30/1.

17. The recording medium according to claim 16, wherein a mixing weight ratio of the alumina hydrate to the binder is in the range of from 5/1 to 25/1.

* * * * *

UNITED STATES PATENT AND TRADEMARK OFFICE
CERTIFICATE OF CORRECTION

PATENT NO.   : 5,635,291
DATED        : June 3, 1997
INVENTOR(S)  : Hitoshi Yoshino et al.

It is certified that error appears in the above-identified patent and that said Letters Patent is hereby corrected as shown below:

Title page,
Item [56], FOREIGN PATENT DOCUMENTS,

"0500021    2/1992    European Pat. Off." should
read --  0500021    8/1992    European Pat. Off. --;

"2276670    11/1990    Japan.
 2276671    11/1990    Japan.
 3143678    6/1991    Japan." should read -- 2-276670    11/1990    Japan
 2-276671    11/1990    Japan
 3-143678    6/1991    Japan --; and "3275378    12/1991    Japan.
 3281384    12/1991    Japan.
 3285814    12/1991    Japan." should read -- 3-275378    12/1991    Japan
 3-281384    12/1991    Japan
 3-285814    12/1991    Japan --.

"4267180    9/1992    Japan" should read
-- 4-267180    9/1992    Japan --.

Figure 6:
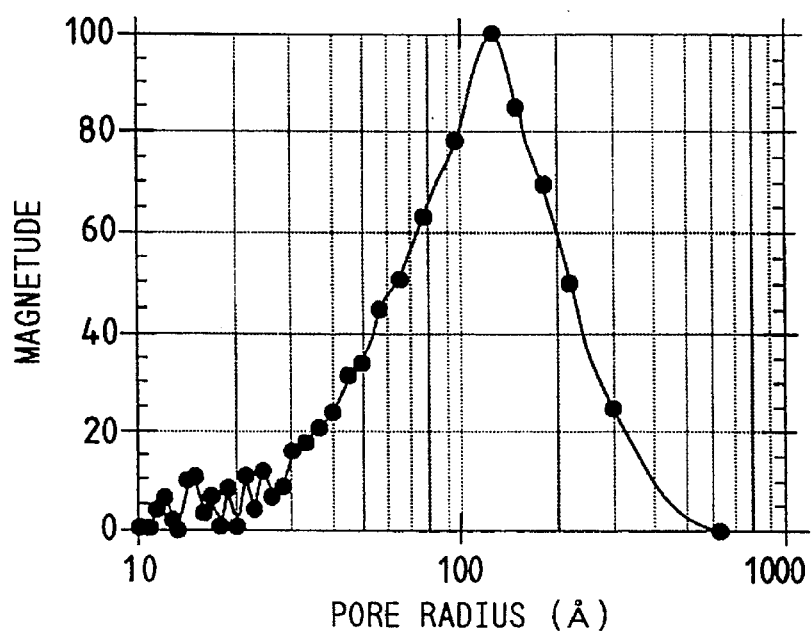
FIG. 6 diagrammatically illustrates the pore radius distribution of the alumina hydrate used in the first aspect of the present invention.

Drawings,
Sheet 4, Fig. 6, "MAGNETUDE" should read -- MAGNITUDE --.
Sheet 5, Fig. 8, "MAGNETUDE" should read -- MAGNITUDE --.
Sheet 7, Fig. 11, "MAGNETUDE" should read -- MAGNITUDE --.

Column 1,
Line 7, "Particular" should read -- particular --.
Line 25, "cess" should read -- cesses --.

Column 3,
Line 8, "tends" should read -- tend --.

Column 7,
Line 46, "the" (second occurrence) should be deleted.

UNITED STATES PATENT AND TRADEMARK OFFICE
CERTIFICATE OF CORRECTION

PATENT NO.     : 5,635,291
DATED          : June 3, 1997
INVENTOR(S)    : Hitoshi Yoshino et al.

It is certified that error appears in the above-identified patent and that said Letters Patent is hereby corrected as shown below:

Column 9,
Line 26, "Coating" should read -- coating --.
Line 47, "of" should read -- for --.

Column 10,
Line 56, should be deleted.
Line 64, "plain" should read -- plane --; and "another" should read -- other --.

Column 11,
Line 4, "another" should read -- other --.
Line 7, "is" should be deleted.
Line 9, "Althogh" should read -- Although --; and "the" should be deleted.
Line 11, "peaks" should read -- peak --.
Line 21, "plain" should read -- plane --.
Line 22, "another" should read -- other --.
Line 23, "fade" should read -- face --.

Column 14,
Line 47, "aspect" should read -- aspects --.

Column 15,
Line 35, "method" should read -- methods --.
Line 59, "low" should read -- lower --.

Column 16,
Line 35, "low" should read -- lower --.

Column 18,
Line 21, "tend" should read -- tends --.
Line 33, "using" should read -- being used --.

Column 19,
Line 36, "by" should read -- be --.
Line 53, "comprises" should read -- comprise --.

Column 21,
Line 54, "was" should read -- were --.

UNITED STATES PATENT AND TRADEMARK OFFICE
CERTIFICATE OF CORRECTION

PATENT NO.   : 5,635,291
DATED        : June 3, 1997
INVENTOR(S)  : Hitoshi Yoshino et al.

It is certified that error appears in the above-identified patent and that said Letters Patent is hereby corrected as shown below:

Column 22,
Line 27, "layers" should read -- layer --.

Column 23,
Line 51, "former" should read -- formed --.

Signed and Sealed this

Third Day of December, 2002

JAMES E. ROGAN
*Director of the United States Patent and Trademark Office*